(12) United States Patent
Tan

(10) Patent No.: US 12,726,620 B2
(45) Date of Patent: Sep. 1, 2026

(54) IMAGE DECODING METHOD, IMAGE ENCODING METHOD, STORAGE MEDIUM STORING BITSTREAM AND METHOD FOR TRANSMITTING BITSTREAM

(71) Applicant: LG Electronics Inc., Seoul (KR)

(72) Inventor: Hendry Tan, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 19/219,704

(22) Filed: May 27, 2025

(65) Prior Publication Data

US 2025/0286998 A1 Sep. 11, 2025

Related U.S. Application Data

(63) Continuation of application No. PCT/KR2024/009604, filed on Jul. 5, 2024.

(Continued)

(51) Int. Cl.
*H04N 19/117* (2014.01)
*H04N 19/136* (2014.01)

(Continued)

(52) U.S. Cl.
CPC ......... *H04N 19/117* (2014.11); *H04N 19/136* (2014.11); *H04N 19/172* (2014.11); *H04N 19/184* (2014.11); *H04N 19/42* (2014.11)

(58) Field of Classification Search
None
See application file for complete search history.

(56) References Cited

U.S. PATENT DOCUMENTS

2022/0141496 A1 5/2022 Li et al.
2022/0329837 A1 10/2022 Li et al.

(Continued)

FOREIGN PATENT DOCUMENTS

KR 10-20230078658 A 6/2023
KR 10-20230079360 A 6/2023

OTHER PUBLICATIONS

International Search Report in International Appln. No. PCT/KR2024/009604, mailed on Oct. 22, 2024, 5 pages.

(Continued)

*Primary Examiner* — Stuart D Bennett
(74) *Attorney, Agent, or Firm* — Fish & Richardson P.C.

(57) ABSTRACT

Disclosed herein are an image decoding/encoding method, a storage medium storing a bitstream and a method for transmitting a bitstream. According to an aspect of the present disclosure, an image decoding method include obtaining a NNPF SEI message, the NNPF SEI message including a NNPFC SEI message and a NNPFA SEI message, determining a neural-network that can be used as a post-processing filer based on the NNPFC SEI message, and determining whether to activate a target NNPF that can be applied to the current picture based on the NNPFA SEI message, wherein the target NNPF is used for post-processing filtering for the current picture and subsequent pictures of a current layer in output order until a picture in a current layer associated with an NNPFA SEI message with the same target NNPF ID information as a current SEI message is output that follows the current picture in the output order.

7 Claims, 12 Drawing Sheets

NNPFC SEI
nnpfc_id: 1
nnpfc_base_flag: 1

NNPFA SEI
nnpfa_target_id: 1
nnpfa_target_base_flag: 0

PU
POC 0

PU
POC 1

PU
POC 2

NNPFC SEI
nnpfc_id: 1
nnpfc_base_flag: 0

NNPFA SEI
nnpfa_target_id: 1
nnpfa_target_base_flag: 1

PU
POC 3

CANCEL PERSISTENCE

Related U.S. Application Data

(60) Provisional application No. 63/525,146, filed on Jul. 5, 2023.

(51) Int. Cl.
*H04N 19/172* (2014.01)
*H04N 19/184* (2014.01)
*H04N 19/42* (2014.01)

(56) References Cited

U.S. PATENT DOCUMENTS

2024/0340431 A1* 10/2024 Cricrì .................. H04N 19/169
2025/0008094 A1* 1/2025 Deshpande ........... H04N 19/80

OTHER PUBLICATIONS

Wang et al., "AHG9: NNPF activation parameters," JVET-AD0089-v1, Joint Video Experts Team (JVET) of ITU-T SG 16 WP 3 and ISO/IEC JTC 1/SC 29, 30th Meeting, Antalya, TR, Apr. 21-28, 2023, 16 pages.

* cited by examiner

FIG. 5

| 0 | 1 | 4 | 5 | ··· |
| --- | --- | --- | --- | --- |
| 2 | 3 | 6 | 7 | ··· |
| 8 | 9 | 12 | 13 | ··· |
| 10 | 11 | 14 | 15 | ··· |
| ··· | ··· | ··· | ··· | ··· |

| 0 | 4 | ··· |
| --- | --- | --- |
| 8 | 12 | ··· |
| ··· | ··· | ··· |

| 1 | 5 | ··· |
| --- | --- | --- |
| 9 | 13 | ··· |
| ··· | ··· | ··· |

| 2 | 6 | ··· |
| --- | --- | --- |
| 10 | 14 | ··· |
| ··· | ··· | ··· |

| 3 | 7 | ··· |
| --- | --- | --- |
| 11 | 16 | ··· |
| ··· | ··· | ··· |

IMAGE DECODING METHOD, IMAGE ENCODING METHOD, STORAGE MEDIUM STORING BITSTREAM AND METHOD FOR TRANSMITTING BITSTREAM

CROSS-REFERENCE TO RELATED APPLICATIONS

This application is a Bypass Continuation Application of International Application No. PCT/KR2024/009604, filed on Jul. 5, 2024, which claims priority from U.S. Application No. 63/525,146, filed on Jul. 5, 2023, the disclosures of which are incorporated by reference in their entireties.

BACKGROUND

1. Field

The present disclosure relates to an image encoding/decoding method, a recording medium storing a bitstream, and a method of transmitting a bitstream, and more particularly, to a method of determining whether to cancel the persistence of a neural network post-filter (NNPF).

2. Description of the Related Art

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

SUMMARY

The present disclosure is directed to providing an image encoding/decoding method and apparatus with improved encoding/decoding efficiency.

The present disclosure is also directed to providing a method of clearly determining which neural network post-filter (NNPF)'s persistence should be cancelled when there is activation of two or more NNPFs with the same identification information.

The present disclosure is also directed to providing a method of preventing simultaneous activation of two or more NNPFs with the same identification information.

The present disclosure is also directed to providing a non-transitory computer-readable recording medium for storing a bitstream generated using an image encoding method according to the present disclosure.

The present disclosure is also directed to providing a method of transmitting a bitstream generated using an image encoding method according to the present disclosure.

The present disclosure is also directed to providing a non-transitory computer-readable recording medium for storing a bitstream which is received and decoded by an image decoding apparatus according to the present disclosure and used for reconstructing an image.

Technical objects of the present disclosure are not limited to those described above, and other technical objects that have not been described above will be clearly understood by those skilled in the technical field to which the present disclosure pertains from the following description.

According to an aspect of the present disclosure, an image decoding method performed by a decoding apparatus may include obtaining neural-network post-filter (NNPF) supplemental enhancement information (SEI) message, the NNPF SEI message including a neural-network post-filter characteristics (NNPFC) SEI message and a neural-network post-filter activation (NNPFA) SEI message, determining a neural-network that can be used as a post-processing filer based on the NNPFC SEI message, and determining whether to activate a target NNPF that can be applied to the current picture based on the NNPFA SEI message, wherein the target NNPF is used for post-processing filtering for the current picture and subsequent pictures of a current layer in output order until a picture in a current layer associated with an NNPFA SEI message with the same target NNPF ID information as a current SEI message is output that follows the current picture in the output order.

According to an aspect of the present disclosure, an image encoding method performed by an encoding apparatus may include encoding a neural-network that can be used as a post-processing filer into a neural-network post-filter characteristics (NNPFC) SEI message included in the NNPF SEI message, and encoding whether a target NNPF that can be applied to the current picture is activated with a neural-network post-filter activation (NNPFA) SEI message included in the NNPF SEI message, wherein the target NNPF is used for post-processing filtering for the current picture and subsequent pictures of a current layer in output order until a picture in a current layer associated with an NNPFA SEI message with the same target NNPF ID information as a current SEI message is output that follows the current picture in the output order.

A computer-readable recording medium according to another aspect of the present disclosure can store a bitstream generated by an image encoding method or device of the present disclosure.

A transmission method according to another aspect of the present disclosure can transmit a bitstream generated by an image encoding method or device of the present disclosure.

The features of the present disclosure briefly summarized above are merely illustrative aspects of the detailed description of the present disclosure and do not limit the scope of the present disclosure.

According to the present disclosure, it is possible to provide an image encoding/decoding method and apparatus with improved encoding/decoding efficiency.

According to the present disclosure, it is possible to clearly determine a neural network post-filter (NNPF) of which the persistence will be cancelled when there is activation of two or more NNPFs with the same identification information.

According to the present disclosure, it is possible to prevent simultaneous activation of two or more NNPFs with the same identification information.

According to the present disclosure, it is possible to provide a non-transitory computer-readable recording medium for storing a bitstream generated using an image encoding method according to the present disclosure.

According to the present disclosure, it is possible to provide a non-transitory computer-readable recording medium for storing a bitstream which is received and decoded by an image decoding apparatus according to the present disclosure and used for reconstructing an image.

According to the present disclosure, it is possible to provide a method of transmitting a bitstream generated using an image encoding method.

Effects of the present disclosure are not limited to those described above, and other effects that have not been described above will be clearly understood by those skilled in the technical field to which the present disclosure pertains.

BRIEF DESCRIPTION OF DRAWINGS

Figure 5:
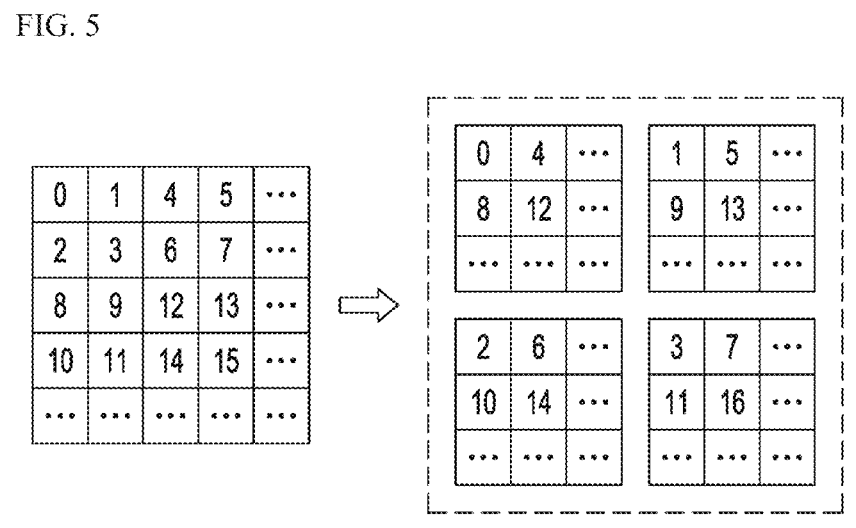

FIG. 5 is a diagram illustrating an interleaving method for deriving a luma channel.

DETAILED DESCRIPTION

Figure 1:
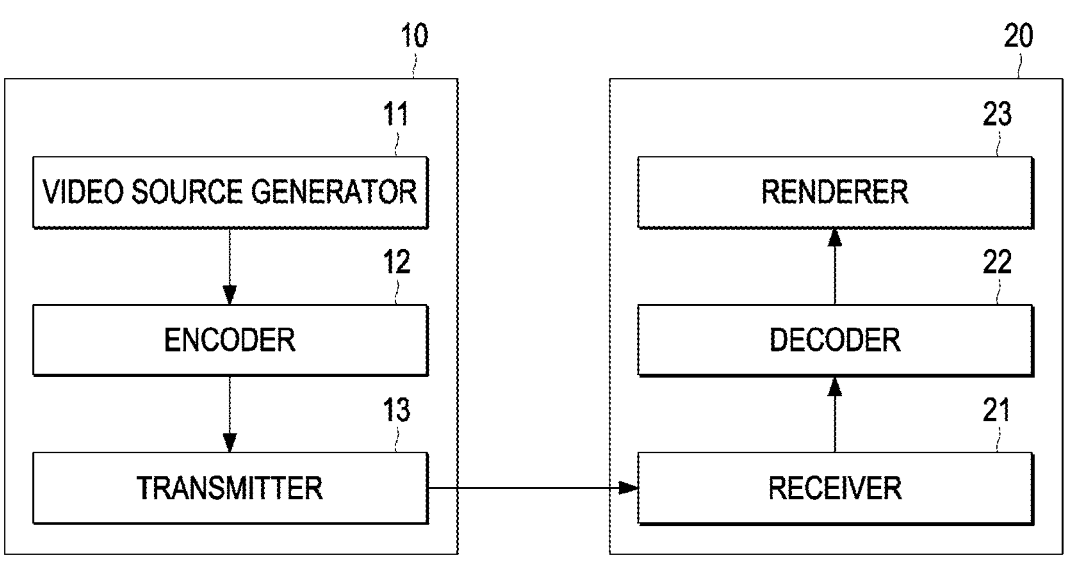
FIG. 1 is a view schematically showing a video coding system to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

The present disclosure presents various embodiments of video/image coding, and unless otherwise stated, the embodiments may be performed in combination with each other.

The terms used in the present disclosure may have their usual meanings in the technical field to which the present disclosure belongs, unless newly defined in the present disclosure.

In the present disclosure, a "picture" generally means a unit representing one image of a specific time period, and a slice/tile is a coding unit constituting a part of a picture, and one picture may be composed of one or more slices/tiles. In addition, a slice/tile may include one or more CTUs (coding tree units). One picture may be composed of one or more tile groups. One tile group may include one or more tiles. A brick may represent a rectangular area of CTU rows of tiles in a picture. In this document, tile group and slice may be used interchangeably. For example, in this document, a tile group/tile group header may be called a slice/slice header.

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. One unit may include one luma block and two chroma (e.g., Cb, Cr) blocks. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The chroma component block of the current block may be expressed by including an explicit description of a chroma component block such as "chroma block" or "current chroma block.

In the present disclosure, the term "/" and "," should be interpreted to indicate "and/or". For instance, the expression "A/B" and "A, B" may mean "A and/or B." Further, "A/B/C" and "A, B, C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view schematically showing a video coding system to which an embodiment of the present disclosure is applicable.

The video coding system according to an embodiment may include an encoding device 10 and a decoding device 20. The encoding device 10 may deliver encoded video and/or image information or data to the decoding device 20 in the form of a file or streaming via a digital storage medium or network.

The encoding device 10 according to an embodiment may include a video source generator 11, an encoder 12 and a transmitter 13. The decoding device 20 according to an embodiment may include a receiver 21, a decoder 22 and a renderer 23. The encoder 12 may be called a video/image encoding apparatus, and the decoder 22 may be called a video/image decoding apparatus. The transmitter 13 may be included in the encoder 12. The receiver 21 may be included in the decoder 22. The renderer 23 may include a display and the display may be configured as a separate device or an external component.

The video source generator 11 may obtain a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoder 12 may encode an input video/image. The encoder 12 may perform a series of procedures such as prediction, transform, and quantization for compression and coding efficiency. The encoder 12 may output encoded data (encoded video/image information) in the form of a bitstream.

The transmitter 13 may transmit the encoded video/image information or data output in the form of a bitstream to the receiver 21 of the decoding device 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The transmitter 13 may be provided as a separate transmission device from the encoder 120. In this case, the transmission device includes at least one processor that obtains encoded video/image information or data output in the form of a bitstream and a transmitter that delivers it in the form of a file or streaming. The receiver 21 may extract/receive the bitstream from the storage medium or network and transmit the bitstream to the decoder 22.

The decoder 22 may decode the video/image by performing a series of procedures such as dequantization, inverse transform, and prediction corresponding to the operation of the encoder 12.

The renderer 23 may render the decoded video/image. The rendered video/image may be displayed through the display.

Overview of the Video Encoding Device

Figure 2:
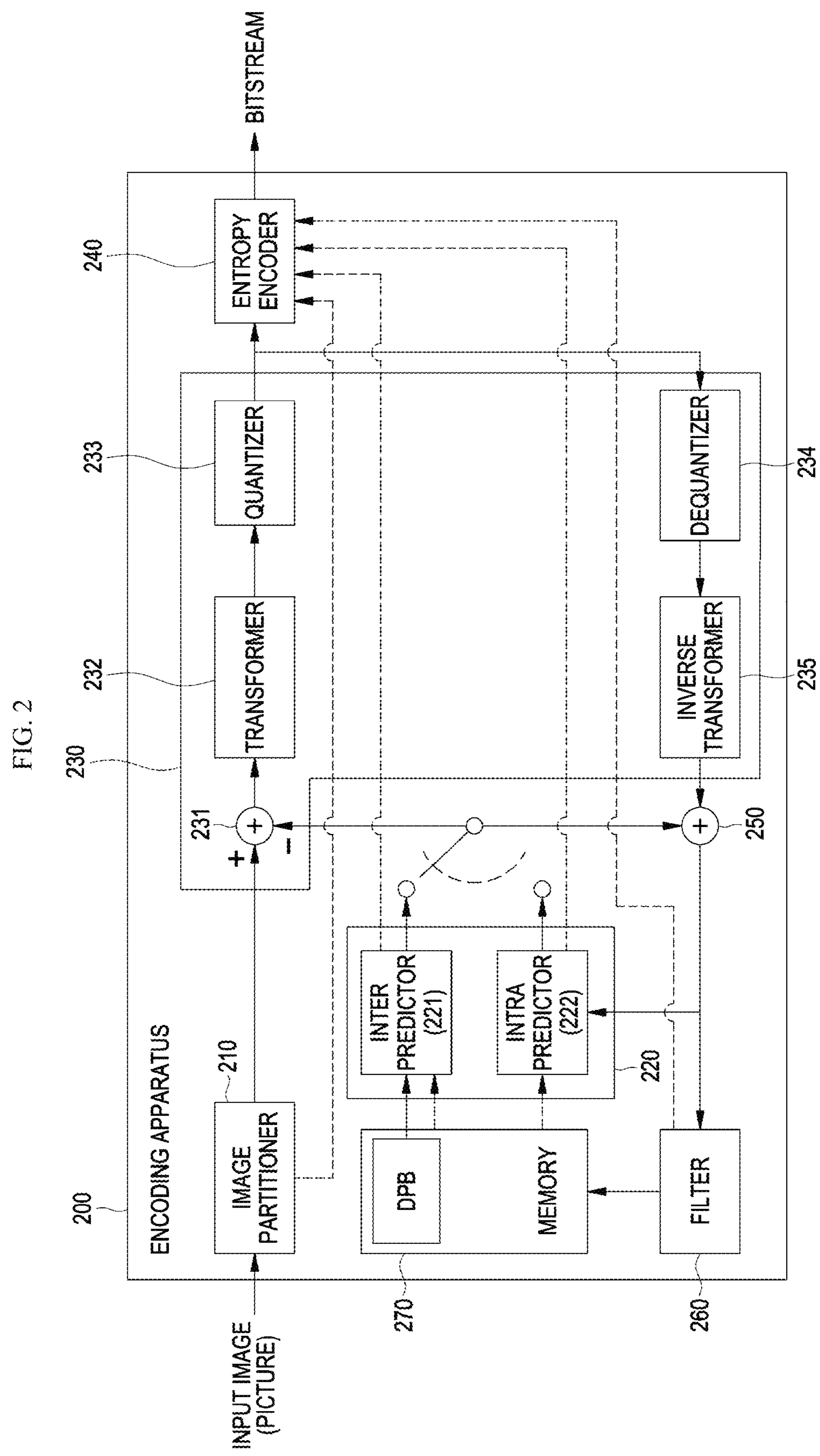
FIG. 2 is a diagram schematically illustrating an image encoding device to which an embodiment according to the present disclosure can be applied.

FIG. 2 is a diagram schematically illustrating an image encoding device to which an embodiment according to the present disclosure can be applied.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The subtraction unit 115 can subtract the prediction signal (predicted block, predicted sample array) output from the prediction unit 200 from the input image signal (original block, original sample array) to generate a residual signal (residual block, residual sample array). The generated residual signal can be transmitted to the conversion unit 232.

The transformer 232 may generate transform coefficients by applying a transform technique to the residual signal. For example, the transform technique may include at least one of a discrete cosine transform (DCT), a discrete sine transform (DST), a karhunen-loéve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated.

The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235.

The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Overview of Image Decoding Device

Figure 3:
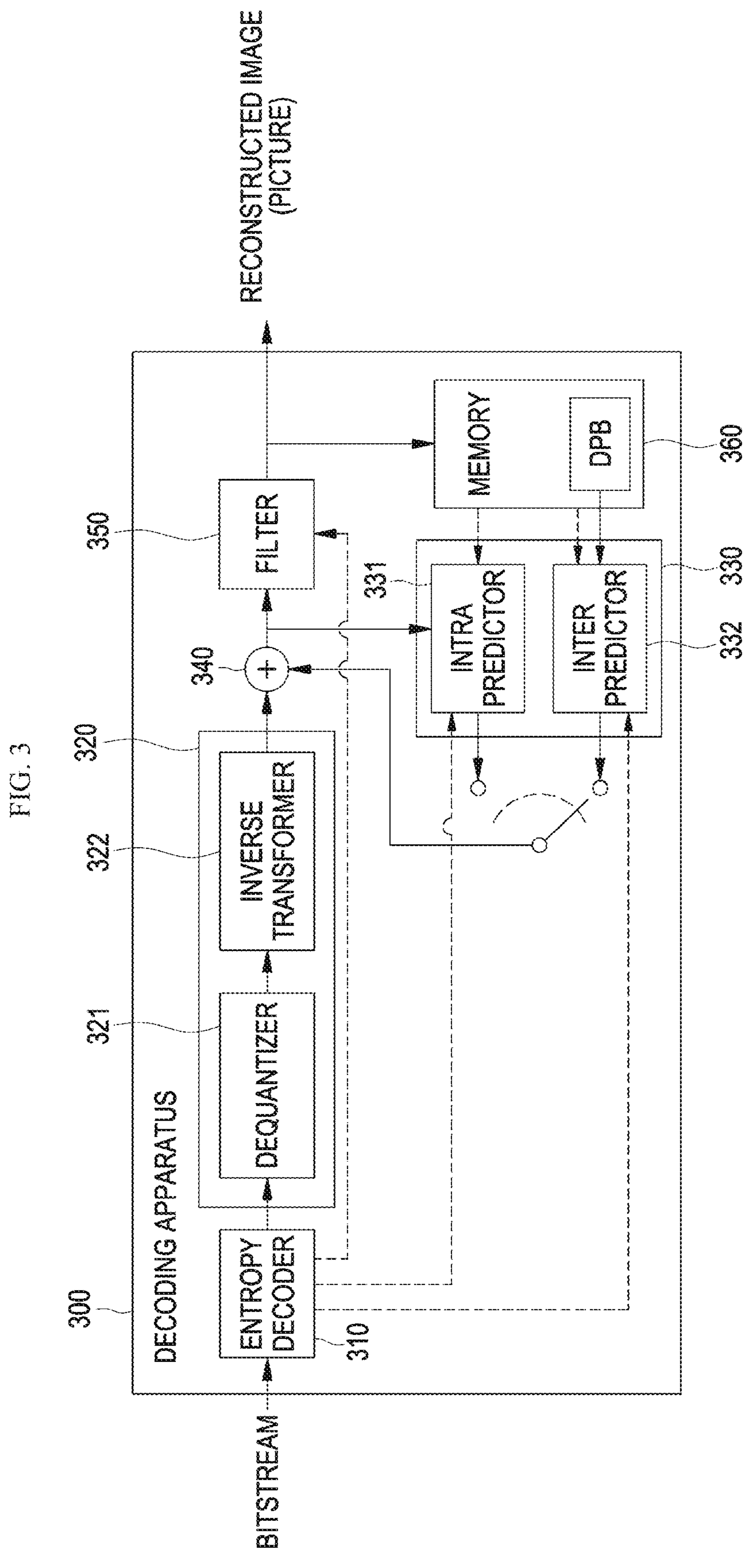
FIG. 3 is a schematic diagram illustrating an image decoding device to which an embodiment according to the present disclosure can be applied.

FIG. 3 is a schematic diagram illustrating an image decoding device to which an embodiment according to the present disclosure can be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component. When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310.

Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The prediction unit 330 may generate a prediction signal based on various prediction methods (techniques) described below, which is the same as that mentioned in the description of the prediction unit 220 of the image encoding device 200.

The intra predictor 332 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 331 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block. The adder 340 may be called reconstructor or a reconstructed block generator. The generated reconstructed signal may be used for intra prediction of a next block to be processed in the current picture, may be output through filtering as described below, or may be used for inter prediction of a next picture.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 100 may be the same as or respectively applied to correspond to the filter 350, the inter predictor 332, and the intra predictor 331 of the decoding apparatus 300. The same may also apply to the unit 332 and the intra predictor 331.

Figure 4:
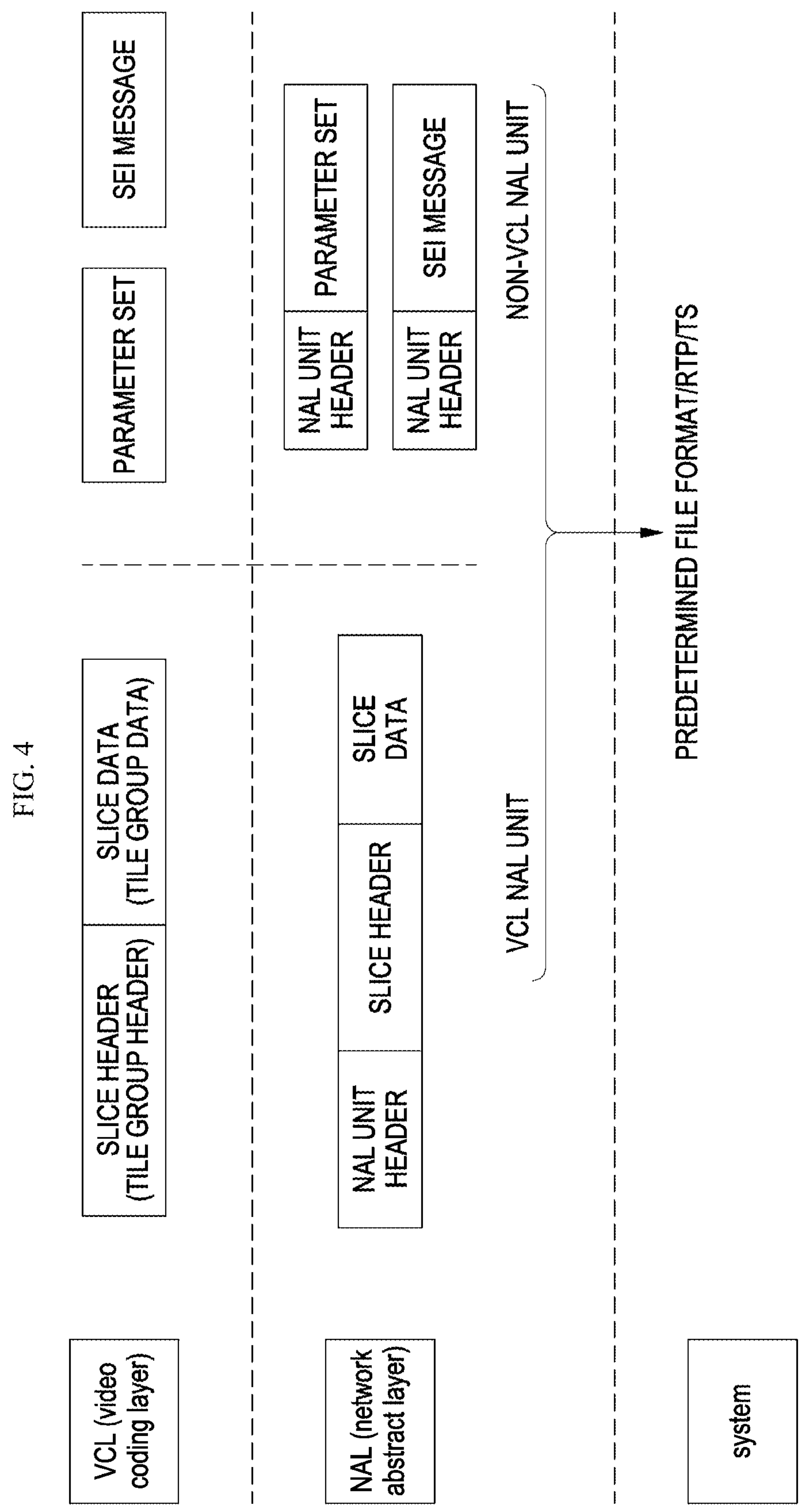
FIG. 4 exemplarily shows a hierarchical structure for coded video/image to which an embodiment according to the present disclosure can be applied.

FIG. 4 exemplarily shows a hierarchical structure for coded video/image to which an embodiment according to the present disclosure can be applied.

Referring to FIG. 4, coded image/video is divided into a VCL (video coding layer) that handles the decoding process of the image/video and itself, a subsystem that transmits and stores the coded information, and NAL (network abstraction layer) in charge of function and present between the VCL and the subsystem.

In the VCL, VCL data including compressed image data (slice data) is generated, or a parameter set including a picture parameter set (PSP), a sequence parameter set (SPS), and a video parameter set (VPS) or a supplemental enhancement information (SEI) message additionally required for an image decoding process may be generated.

In the NAL, a NAL unit may be generated by adding header information (NAL unit header) to a raw byte sequence payload (RBSP) generated in a VCL. In this case, the RBSP refers to slice data, parameter set, SEI message, etc., generated in the VCL. The NAL unit header may include NAL unit type information specified according to RBSP data included in the corresponding NAL unit.

As shown in the figure, the NAL unit may be classified into a VCL NAL unit and a Non-VCL NAL unit according to the RBSP generated in the VCL. The VCL NAL unit may mean a NAL unit that includes information on the image (slice data) on the image, and the Non-VCL NAL unit may mean a NAL unit that includes information (parameter set or SEI message) required for decoding the image.

The above-described VCL NAL unit and Non-VCL NAL unit may be transmitted through a network by attaching header information according to the data standard of the subsystem. For example, the NAL unit may be transformed into a data format of a predetermined standard such as an H.266/VVC file format, a real-time transport protocol (RTP), a transport stream (TS), etc., and transmitted through various networks.

As described above, the NAL unit may be specified with the NAL unit type according to the RBSP data structure included in the corresponding NAL unit, and information on the NAL unit type may be stored and signaled in the NAL unit header.

For example, the NAL unit may be classified into a VCL NAL unit type and a Non-VCL NAL unit type according to whether the NAL unit includes information (slice data) about an image. The VCL NAL unit type may be classified according to the nature and type of pictures included in the VCL NAL unit, and the Non-VCL NAL unit type may be classified according to types of parameter sets.

The following is an example of the NAL unit type specified according to the type of parameter set included in the Non-VCL NAL unit type.

APS (Adaptation Parameter Set) NAL unit: Type for NAL unit including APS

DPS (Decoding Parameter Set) NAL unit: Type for NAL unit including DPS

VPS (Video Parameter Set) NAL unit: Type for NAL unit including VPS

SPS(Sequence Parameter Set) NAL unit: Type for NAL unit including SPS

PPS (Picture Parameter Set) NAL unit: Type for NAL unit including PPS

The aforementioned NAL unit types may have syntax information for the NAL unit type, and the syntax information may be stored and signaled in a NAL unit header. For example, the syntax information may be nal_unit_type, and NAL unit types may be specified by a nal_unit_type value.

The slice header (slice header syntax) may include information/parameters that may be commonly applied to the slice. The APS (APS syntax) or the PPS (PPS syntax) may include information/parameters that may be commonly applied to one or more slices or pictures. The SPS (SPS syntax) may include information/parameters that may be commonly applied to one or more sequences. The VPS (VPS syntax) may include information/parameters that may be commonly applied to multiple layers. The DPS (DPS syntax) may include information/parameters that may be commonly applied to the overall video. The DPS may include information/parameters related to concatenation of a coded video sequence (CVS). High level syntax (HLS) in this document may include at least one of the APS syntax, PPS syntax, SPS syntax, VPS syntax, DPS syntax, a picture header syntax and slice header syntax.

In this document, the image/video information encoded from the encoding apparatus and signaled to the decoding apparatus in the form of a bitstream includes not only partitioning related information in a picture, intra/inter prediction information, residual information, in-loop filtering information, etc, but also information included in a slice header, information included in the picture header, information included in the APS, information included in the PPS, information included in an SPS, information included in a VPS and/or information included in a DPS.

General Post-Processing Filtering Process Using NNPFs

Input to this process is a bitstream BitstreamToFilter. Output of this process is a list of NNPF output pictures ListNnpfOutputPics. First, BitstreamToFilter is decoded, and the list CroppedDecodedPictures is set to be the list of the cropped decoded pictures in output order resulted from decoding BitstreamToFilter. Second, the filtering process for one picture is repeatedly invoked, in output order, for each cropped decoded picture that is in CroppedDecodedPictures and for which one or more NNPFs are activated. The order of the pictures in ListNnpfOutputPics is in output order.

Within ListNnpfOutputPics there shall be no more than one picture pertaining to any particular output time instance. When for any particular picture in CroppedDecodedPictures there are multiple NNPFs activated and only one the NNPFs is allowed to be chosen to be applied although any of the NNPFs may be chosen, the above constraint shall apply regardless of which NNPF is chosen to be applied to the particular picture.

The filtering process specified applies to each cropped decoded picture, referred to as the current picture, that is in CroppedDecodedPictures and for which one or more NNPFs are activated. When applying an NNPF to the current picture, the filtered and/or interpolated pictures are generated by the NNPF by applying the NNPF process specified in the semantics of the NNPFC SEI message, in a patch-wise manner, to the current picture.

When applying an NNPF to the current picture, the order of the pictures generated by the NNPF by applying the NNPF process being stored into the output tensor of the NNPF is in output order. When the applied NNPF is the last NNPF that is applied to the current picture, the pictures generated by the NNPF and output by the NNPF process are included into ListNnpfOutputPics, in the same order as when the pictures are stored into the output tensor of the NNPF.

Neural-Network Post-Filter Characteristics SEI Message (NNPFC)

The combinations in Tables 1 to 3 represent the NNPFC syntax structure.

TABLE 1

| | Descriptor |
|---|---|
| nn_post_filter_characteristics( payloadSize ) { | |
| nnpfc_purpose | u(16) |
| nnpfc_id | ue(v) |
| nnpfc_base_flag | u(1) |
| nnpfc_mode_idc | ue(v) |
| if( nnpfc_mode_idc = = 1 ) { | |
| while( !byte_aligned( ) ) | |
| nnpfc_reserved_zero_bit_a | u(1) |
| nnpfc_tag_uri | st(v) |
| nnpfc_uri | st(v) |
| } | |
| nnpfc_property_present_flag | u(1) |
| if( nnpfc_property_present_flag ) { | |
| /* input and output formatting */ | |
| nnpfc_num_input_pics_minus1 | ue(v) |
| if( nnpfc_num_input_pics_minus1 > 0 ) { | |
| for( i = 0; i <= | |
| nnpfc_num_input_pics_minus1; i++ ) | |
| nnpfc_input_pic_output_flag[ i ] | u(1) |
| nnpfc_absent_input_pic_zero_flag | u(1) |
| } | |
| if( chromaUpsamplingFlag ) | |
| nnpfc_out_sub_c_flag | u(1) |
| if( colourizationFlag ) | |
| nnpfc_out_colour_format_idc | u(2) |
| if( resolutionResamplingFlag ) { | |
| nnpfc_pic_width_num_minus1 | ue(v) |
| nnpfc_pic_width_denom_minus1 | ue(v) |
| nnpfc_pic_height_num_minus1 | ue(v) |
| nnpfc_pic_height_denom_minus1 | ue(v) |
| } | |
| if( pictureRateUpsamplingFlag ) | |
| for( i = 0; i < nnpfc_num_input_pics_minus1; i++ ) | |
| nnpfc_interpolated_pics[ i ] | ue(v) |
| nnpfc_component_last_flag | u(1) |

TABLE 2

| | |
|---|---|
| nnpfc_inp_format_idc | ue(v) |
| nnpfc_auxiliary_inp_idc | ue(v) |
| nnpfc_inp_order_idc | ue(v) |
| if( nnpfc_inp_format_idc = = 1 ) { | |
| if( nnpfc_inp_order_idc != 1 ) | |
| nnpfc_inp_tensor_luma_bitdepth_minus8 | ue(v) |
| if( nnpfc_inp_order_idc != 0 ) | |
| nnpfc_inp_tensor_chroma_bitdepth_minus8 | ue(v) |
| } | |
| nnpfc_out_format_idc | ue(v) |
| nnpfc_out_order_idc | ue(v) |
| if( nnpfc_out_format_idc = = 1 ) { | |
| if( nnpfc_out_order_idc != 1 ) | |
| nnpfc_out_tensor_luma_bitdepth_minus8 | ue(v) |
| if( nnpfc_out_order_idc != 0 ) | |
| nnpfc_out_tensor_chroma_bitdepth_minus8 | ue(v) |
| } | |
| nnpfc_separate_colour_description_present_flag | u(1) |
| if( nnpfc_separate_colour_description_present_flag ) { | |
| nnpfc_colour_primaries | u(8) |
| nnpfc_transfer_characteristics | u(8) |
| if( nnpfc_out_format_idc = = 1 ) { | |
| nnpfc_matrix_coeffs | u(8) |
| nnpfc_full_range_flag | u(1) |
| } | |
| } | |
| nnpfc_chroma_loc_info_present_flag | u(1) |
| if( nnpfc_chroma_loc_info_present_flag ) | |
| nnpfc_chroma_sample_loc_type_frame | ue(v) |
| nnpfc_overlap | ue(v) |
| nnpfc_constant_patch_size_flag | u(1) |
| if( nnpfc_constant_patch_size_flag ) { | |
| nnpfc_patch_width_minus1 | ue(v) |
| nnpfc_patch_height_minus1 | ue(v) |

TABLE 3

| | |
|---|---|
| } else { | |
| nnpfc_extended_patch_width_cd_delta_minus1 | ue(v) |
| nnpfc_extended_patch_height_cd_delta_minus1 | ue(v) |
| } | |
| nnpfc_padding_type | ue(v) |
| if( nnpfc_padding_type = = 4 ) { | |
| if( nnpfc_inp_order_idc != 1 ) | |
| nnpfc_luma_padding_val | ue(v) |
| if( nnpfc_inp_order_idc != 0 ) { | |
| nnpfc_cb_padding_val | ue(v) |
| nnpfc_cr_padding_val | ue(v) |
| } | |
| } | |
| nnpfc_complexity_info_present_flag | u(1) |
| if( nnpfc_complexity_info_present_flag ) { | |
| nnpfc_parameter_type_idc | u(2) |
| if( nnpfc_parameter_type_idc != 2 ) | |
| nnpfc_log2_parameter_bit_length_minus3 | u(2) |
| nnpfc_num_parameters_idc | u(6) |
| nnpfc_num_kmac_operations_idc | ue(v) |
| nnpfc_total_kilobyte_size | ue(v) |
| } | |
| nnpfc_metadata_extension_num_bits | ue(v) |
| if( nnpfc_metadata_extension_num_bits > 0 ) | |
| nnpfc_reserved_metadata_extension | u(v) |
| } | |
| /* ISO/IEC 15938-17 bitstream */ | |
| if( nnpfc_mode_idc = = 0 ) { | |
| while( !byte_aligned( ) ) | |
| nnpfc_reserved_zero_bit_b | u(1) |
| for( i = 0; more_data_in_payload( ); i++ ) | |
| nnpfc_payload_byte[ i ] | b(8) |
| } | |
| } | |

The NNPFC syntax structures of Tables 1 to 3 can be signaled in the form of a supplemental enhancement information (SEI) message. An SEI message signaling the NNPFC syntax structures of Tables 1 to 3 can be referred to as an NNPFC SEI message.

The neural-network post-filter characteristics (NNPFC) SEI message specifies a neural network that may be used as a post-processing filter. The use of specified neural-network post-processing filters (NNPFs) for specific pictures is indicated with neural-network post-filter activation (NNPFA) SEI messages.

Use of this SEI message requires the definition of the following variables:

Input picture width and height in units of luma samples, denoted herein by CroppedWidth and CroppedHeight, respectively.

Luma sample array CroppedYPic[idx] and chroma sample arrays CroppedCbPic[idx] and CroppedCrPic

[idx], when present, of the input pictures with index idx in the range of 0 to numInputPics-1, inclusive, that are used as input for the NNPF.

Bit depth BitDepthY for the luma sample array of the input pictures.

Bit depth BitDepthC for the chroma sample arrays, if any, of the input pictures.

A chroma format indicator, denoted herein by ChromaFormatIdc.

When nnpfc_auxiliary_inp_idc is equal to 1, a filtering strength control value array StrengthControlVal[idx] that shall contain real numbers in the range of 0 to 1, inclusive, of the input pictures with index idx in the range of 0 to numInputPics-1, inclusive.

Input picture with index 0 corresponds to the picture for which the NNPF defined by this NNPFC SEI message is activated by an NNPFA SEI message. Input picture with index i in the range of 1 to numInputPics-1, inclusive, precedes the input picture with index i-1 in output order.

The variables SubWidthC and SubHeightC are derived from ChromaFormatIdc. More than one NNPFC SEI message can be present for the same picture. When more than one NNPFC SEI message with different values of nnpfc_id is present or activated for the same picture, they can have the same or different values of nnpfc_purpose and nnpfc_mode_idc.

nnpfc_purpose indicates the purpose of the NNPF as specified in Table 3, where (nnpfc_purpose & bitMask) not equal to 0 indicates that the NNPF has the purpose associated with the bitMask value in Table 3. When nnpfc_purpose is greater than 0 and (nnpfc_purpose & bitMask) is equal to 0, the purpose associated with the bitMask value is not applicable to the NNPF. When nnpfc_pupose is equal to 0, the NNPF may be used as determined by the application.

The value of nnpfc_purpose shall be in the range of 0 to 63, inclusive, in bitstreams conforming to this edition of this document. Values of 64 to 65 535, inclusive, for nnpfc_purpose are reserved for future use by ITU-T|ISO/IEC and shall not be present in bitstreams conforming to this edition of this document. Decoders conforming to this edition of this document shall ignore NNPFC SEI messages with nnpfc_purpose in the range of 64 to 65 535, inclusive.

TABLE 4

| bitMask | Interpretation |
|---|---|
| 0x01 | General visual quality improvement |
| 0x02 | Chroma upsampling (from the 4:2:0 chroma format to the 4:2:2 or 4:4:4 chroma format, or from the 4:2:2 chroma format to the 4:4:4 chroma format) |
| 0x04 | Resolution resampling (increasing or decreasing the width or height) |
| 0x08 | Picture rate upsampling |
| 0x10 | Bit depth upsampling (increasing the luma bit depth or the chroma bit depth) |
| 0x20 | Colourization |

The variables chromaUpsamplingFlag, resolutionResamplingFlag, pictureRateUpsampingFlag, bitDepthUpsampngFlag, and colourizationFlag, specifying whether nnpfc_purpose indicates the purpose of the NNPF to include chroma upsampling, resolution resampling, picture rate upsampling, bit depth upsampling, and colourization, respectively, are derived as follows:

TABLE 5

```
chromaUpsamplingFlag = ( ( nnpfc_purpose & 0x02 ) > 0 ) ? 1 : 0
resolutionResamplingFlag = ( ( nnpfc_purpose & 0x04 ) > 0 ) ? 1 : 0
pictureRateUpsamplingFlag = ( ( nnpfc_purpose & 0x08 ) > 0 ) ? 1 : 0
```

TABLE 5-continued

```
bitDepthUpsamplingFlag = ( ( nnpfc_purpose & 0x10 ) > 0 ) ? 1 : 0
colourizationFlag = ( ( nnpfc_purpose & 0x20 ) > 0 ) ? 1 : 0
```

When a reserved value of nnpfc_purpose is taken into use in the future, the syntax of this SEI message could be extended with syntax elements whose presence is conditioned by nnpfc_purpose being equal to that value.

When ChromaFormatIdc is equal to 3, chromaUpsamplingFlag shall be equal to 0.

When ChromaFormatIdc or chromaUpsamplingFlag is not equal to 0, colourizationFlag shall be equal to 0.

When pictureRateUpsamplingFlag is equal to 1 and the input picture with index 0 is associated with a frame packing arrangement SEI message with fp_arrangement_type equal to 5, all input pictures are associated with a frame packing arrangement SEI message with fp_arrangement_type equal to 5 and the same value of fp_current_frame_is_frame0_flag.

The nnpfc_id contains an identifying number that may be used to identify an NNPF. The value of nnpfc_id shall be in the range of 0 to $2^{32}$-2, inclusive. Values of nnpfc_id from 256 to 511, inclusive, and from $2^{31}$ to $2^{32}$-2, inclusive, are reserved for future use by ITU-T| ISO/IEC. Decoders conforming to this edition of this document encountering an NNPFC SEI message with nnpfc_id in the range of 256 to 511, inclusive, or in the range of $2^{31}$ to $2^{32}$-2, inclusive, shall ignore the SEI message.

When an NNPFC SEI message is the first NNPFC SEI message, in decoding order, that has a particular nnpfc_id value within the current CLVS, the following applies:

This SEI message specifies a base NNPF.

This SEI message pertains to the current decoded picture and all subsequent decoded pictures of the current layer, in output order, until the end of the current CLVS.

The nnpfc_base_flag equal to 1 specifies that the SEI message specifies the base NNPF. nnpf_base_flag equal to 0 specifies that the SEI message specifies an update relative to the base NNPF.

The following constraints apply to the value of nnpfc_base_flag:

When an NNPFC SEI message is the first NNPFC SEI message, in decoding order, that has a particular nnpfc_id value within the current CLVS, the value of nnpfc_base_flag shall be equal to 1.

When an NNPFC SEI message nnpfcB is not the first NNPFC SEI message, in decoding order, that has a particular nnpfc_id value within the current CLVS and the value of nnpfc_base_flag is equal to 1, the NNPFC SEI message shall be a repetition of the first NNPFC SEI message nnpfcA with the same nnpfc_id value, in decoding order, i.e., the payload content of nnpfcB shall be the same as that of nnpfcA.

When nnpfc_base_flag is equal to 0, the following applies:

This SEI message defines an update relative to the preceding base NNPF in decoding order with the same nnpfc_id value. Updates are not cumulative but rather each update is applied on the base NNPF, which is the NNPF specified by the first NNPFC SEI message, in decoding order, that has a particular nnpfc_id value within the current CLVS. The NNPF defined by this SEI message is obtained by applying the update defined by this SEI message relative to the base NNPF with the same nnpfc_id value.

This SEI message pertains to the current decoded picture and all subsequent decoded pictures of the current layer, in output order, until the end of the current CLVS or up to but excluding the decoded picture that follows the current decoded picture in output order within the current CLVS and is associated with a subsequent NNPFC SEI message, in decoding order, having nnpfc_base_flag equal to 0 and that particular nnpfc_id value within the current CLVS, whichever is earlier.

The nnpfc_mode_idc equal to 0 indicates that this SEI message contains an ISO/IEC 15938-17 bitstream that specifies a base NNPF (when nnpfc_base_flag is equal to 1) or is an update relative to the base NNPF with the same nnpfc_id value (when nnpfc_base_flag is equal to 0).

When nnpfc_base_flag is equal to 1, the nnpfc_mode_idc equal to 1 specifies that the base NNPF associated with the nnpfc_id value is a neural network identified by the URI indicated by nnpfc_uri with the format identified by the tag URI nnpfc_tag_uri. When nnpfc_base_flag is equal to 0, nnpfc_mode_idc equal to 1 specifies that an update relative to the base NNPF with the same nnpfc_id value is defined by the URI indicated by nnpfc_uri with the format identified by the tag URI nnpfc_tag_uri.

The value of nnpfc_mode_idc shall be in the range of 0 to 1, inclusive, in bitstreams conforming to this edition of this document. Values of 2 to 255, inclusive, for nnpfc_mode_idc are reserved for future and shall not be present in bitstreams conforming to this edition of this document. Decoders conforming to this edition of this document shall ignore NNPFC SEI messages with nnpfc_mode_idc in the range of 2 to 255, inclusive. Values of nnpfc_mode_idc greater than 255 shall not be present in bitstreams conforming to this edition of this document and are not reserved for future use.

The nnpfc_reserved_zero_bit_a shall be equal to 0 in bitstreams conforming to this edition of this document. Decoders shall ignore NNPFC SEI messages in which nnpfc_reserved_zero_bit_a is not equal to 0.

The nnpfc_tag_uri contains a tag URI with syntax and semantics as specified in IETF RFC 4151 identifying the format and associated information about the neural network used as a base NNPF or an update relative to the base NNPF with the same nnpfc_id value specified by nnpfc_uri.

The nnpfc_tag_uri enables uniquely identifying the format of neural network data specified by nnrpf_uri without needing a central registration authority.

The nnpfc_tag_uri equal to "tag:iso.org.2023:15938-17" indicates that the neural network data identified by nnpfc_uri conforms to ISO/IEC 15938-17.

The nnpfc_uri contains a URI with syntax and semantics as specified in IETF Internet Standard 66 identifying the neural network used as a base NNPF or an update relative to the base NNPF with the same nnpfc_id value.

The nnpfc_property_present_flag equal to 1 specifies that syntax elements related to the filter purpose, input formatting, output formatting, and complexity are present. The nnpfc_property_present_flag equal to 0 specifies that no syntax elements related to the filter purpose, input formatting, output formatting, and complexity are present.

When nnpfc_base_flag is equal to 1, nnpfc_property_present_flag shall be equal to 1.

When nnpfc_property_present_flag is equal to 0, the values of all syntax elements that may be present only when nnpfc_property_present_flag is equal to 1 are inferred to be equal to their corresponding syntax elements, respectively, in the NNPFC SEI message that contains the base NNPF for which this SEI message provides an update.

When an NNPFC SEI message nnpfcCurr is not the first NNPFC SEI message, in decoding order, that has a particular nnpfc_id value within the current CLVS, is not a repetition of the first NNPFC SEI message with that particular nnpfc_id (i.e., the value of nnpfc_base_flag is equal to 0), and the value of nnpfc_property_present_flag is equal to 1, the following constraints apply:

The value of nnpfc_purpose in the NNPFC SEI message shall be the same as the value of nnpfc_purpose in the first NNPFC SEI message, in decoding order, that has that particular nnpfc_id value within the current CLVS.

The values of syntax elements following nnpfc_property_present_flag and preceding nnpfc_complexity_info_present_flag, in decoding order, in the NNPFC SEI message shall be the same as the values of corresponding syntax elements in the first NNPFC SEI message, in decoding order, that has that particular nnpfc_id value within the current CLVS.

Either nnpfc_complexity_info_present_flag shall be equal to 0 or both nnpfc_complexity_info_present_flag shall be equal to 1 in the first NNPFC SEI message, in decoding order, that has that particular nnpfc_id value within the current CLVS (denoted as nnpfcBase below) and all the following apply:

nnpfc_parameter_type_idc in nnpfcCurr shall be equal to nnpfc_parameter_type_idc in nnpfcBase.

nnpfc_log 2_parameter_bit_length_minus3 in nnpfcCurr, when present, shall be less than or equal to nnpfc_log 2_parameter_bit_length_minus3 in nnpfcBase.

If nnpfc_num_parameters_idc in nnpfcBase is equal to 0, nnpfc_num_parameters_idc in nnpfcCurr shall be equal to 0.

Otherwise (nnpfc_num_parameters_idc in nnpfcBase is greater than 0), nnpfc_num_parameters_idc in nnpfcCurr shall be greater than 0 and less than or equal to nnpfc_num_parameters_idc in nnpfcBase.

If nnpfc_num_kmac_operations_idc in nnpfcBase is equal to 0, nnpfc_num_kmac_operations_idc in nnpfcCurr shall be equal to 0.

Otherwise (nnpfc_num_kmac_operations_idc in nnpfcBase is greater than 0), nnpfc_num_kmac_operations_idc in nnpfcCurr shall be greater than 0 and less than or equal to nnpfc_num_kmac_operations_idc in nnpfcBase.

If nnpfc_total_kilobyte_size in nnpfcBase is equal to 0, nnpfc_total_kilobyte_size in nnpfcCurr shall be equal to 0.

Otherwise (nnpfc_total_kilobyte_size in nnpfcBase is greater than 0), nnpfc_total_kilobyte_size in nnpfcCurr shall be greater than 0 and less than or equal to nnpfc_total_kilobyte_size in nnpfcBase.

The nnpfc_num_input_pics_minus1 plus 1 specifies the number of pictures used as input for the NNPF. The value of nnpfc_num_input_pics_minus1 shall be in the range of 0 to 63, inclusive. When pictureRateUpsamplingFlag is equal to 1, the value of nnpfc_num_input_pics_minus1 shall be greater than 0.

The variable numInputPics, specifying the number of pictures used as input for the NNPF, is derived as follows:

$$numInputPics=nnpfc\_num\_input\_pics\_minus1+1 \quad \text{[Equation 1]}$$

The nnpfc_input_pic_output_flag[i] equal to 1 indicates that for the i-th input picture the NNPF generates a corresponding output picture. nnpfc_input_pic_output_flag[i] equal to 0 indicates that for the i-th input picture the NNPF does not generate a corresponding output picture. When nnpfc_num_input_pics_minus1 is equal to 0, nnpfc_input_pic_output_flag[0] is inferred to be equal to 1. When pictureRateUpsamplingFlag is equal to 0 and nnpfc_num_input_pics_minus1 is greater than 0, nnpfc_input_pic_output_flag[i] shall be equal to 1 for at least one value of i in the range of 0 to nnpfc_num_input_pics_minus1, inclusive.

The nnpfc_absent_input_pic_zero_flag equal to 1 indicates that the NNPF expects an input picture that is not present in the bitstream to be represented by sample arrays with sample values equal to 0. nnpfc_absent_input_pic_flag equal to 0 indicates that the NNPF expects an input picture that is not present in the bitstream to be represented by the closest input picture in output order within the bitstream. nnpfc_out_sub_c_flag specifies the values of the variables outSubWidthC and outSubHeightC when chromaUpsamplingFlag is equal to 1. The nnpfc_out_sub_c_flag equal to 1 specifies that outSubWidthC is equal to 1 and outSubHeightC is equal to 1. nnpfc_out_sub_c_flag equal to 0 specifies that outSubWidthC is equal to 2 and outSubHeightC is equal to 1. When ChromaFormatIdc is equal to 2 and nnpfc_out_sub_c_flag is present, the value of nnpfc_out_sub_c_flag shall be equal to 1.

The nnpfc_out_colour_format_idc, when colourizationFlag is equal to 1, specifies the colour format of the NNPF output and consequently the values of the variables outSubWidthC and outSubHeightC. nnpfc_out_colour_format_idc equal to 1 specifies that the colour format of the NNPF output is the 4:2:0 format and outSubWidthC and outSubHeightC are both equal to 2. The nnpfc_out_colour_format_idc equal to 2 specifies that the colour format of the NNPF output is the 4:2:2 format and outSubWidthC is equal to 2 and outSubHeightC is equal to 1. The nnpfc_out_colour_format_idc equal to 3 specifies that the colour format of the NNPF output is the 4:4:4 format and outSubWidthC and outSubHeightC are both equal to 1. The value of nnpfc_out_colour_format_idc shall not be equal to 0.

When chromaUpsamplingFlag and colourizationFlag are both equal to 0, outSubWidthC and outSubHeightC are inferred to be equal to SubWidthC and SubHeightC, respectively. The nnpfc_pic_width_num_minus1 plus 1 and nnpfc_pic_width_denom_minus1 plus 1 specify the numerator and denominator, respectively, for the resampling ratio of the NNPF output picture width relative to CroppedWidth. The value of (nnpfc_pic_width_num_minus1+1)÷(nnpfc_pic_width_denom_minus1+1) shall be in the range of 1÷16 to 16, inclusive. When nnpfc_pic_width_num_minus1 and nnpfc_pic_width_denom_minus1 are not present, the values of nnpfc_pic_width_num_minus1 and nnpfc_pic_width_denom_minus1 are both inferred to be equal to 0.

The variable nnpfcOutputPicWidth, representing the width of the luma sample arrays of the picture(s) resulting from applying the NNPF identified by nnpfc_id to the input picture(s), is derived as follows:

$$nnpfcOutputPicWidth = \mathrm{Ceil}(CroppedWidth * (nnpfc\_pic\_width\_num\_minus1 + 1) \div (nnpfc\_pic\_width\_denom\_minus1 + 1)) \quad \text{[Equation 2]}$$

It is a requirement of bitstream conformance that the value of nnpfcOutputPicHeight % outSubHeightC shall be equal to 0.

nnpfc_pic_height_num_minus1 plus 1 and nnpfc_pic_height_denom_minus1 plus 1 specify the numerator and denominator, respectively, for the resampling ratio of the NNPF output picture height relative to CroppedHeight. The value of (nnpfc_pic_height_num_minus1+1)÷(nnpfc_pic_height_denom_minus1+1) shall be in the range of 1÷16 to 16, inclusive. When nnpfc_pic_height_num_minus1 and nnpfc_pic_height_denom_minus1 are not present, the values of nnpfc_pic_height_num_minus1 and nnpfc_pic_height_denom_minus1 are both inferred to be equal to 0.

The variable nnpfcOutputPicHeight, representing the height of the luma sample arrays of the picture(s) resulting from applying the NNPF identified by nnpfc_id to the input picture(s), is derived as follows:

$$nnpfcOutputPicHeight = \mathrm{Ceil}(CroppedHeight * (nnpfc\_pic\_height\_num\_minus1 + 1) \div (nnpfc\_pic\_height\_denom\_minus1 + 1)) \quad \text{[Equation 3]}$$

It is a requirement of bitstream conformance that the value of nnpfcOutputPicHeight % outSubHeightC shall be equal to 0.

When nnpfc_pic_width_num_minus1, nnpfc_pic_width_denom_minus1, nnpfc_pic_height_num_minus1, and nnpfc_pic_height_denom_minus1 are present, at least one the following shall be true:

- The value of nnpfcOutputPicWidth is not equal to CroppedWidth.
- The value of nnpfcOutputPicHeight is not equal to CroppedHeight.
- nnpfc_interpolated_pics[i] specifies the number of interpolated pictures generated by the NNPF between the i-th and the (i+1)-th picture used as input for the NNPF. The value of nnpfc_interpolated_pics[i] shall be in the range of 0 to 63, inclusive.
- The value of nnpfc_interpolated_pics[i] shall be greater than 0 for at least one value of i in the range of 0 to nnpfc_num_input_pics_minus1-1, inclusive.

The variables NumInpPicsInOutputTensor, specifying the number of pictures that have a corresponding input picture and are present in the output tensor of the NNPF, InpIdx[idx] specifying the input picture index of the idx-th picture that is present in the output tensor of the NNPF and has a corresponding input picture, and numOutputPics, specifying the total number of pictures present in the output tensor of the NNPF, are derived as follows:

TABLE 6

```
for( i = 0, numOutputPics = 0; i < numInputPics; i++ )
  if( nnpfc_input_pic_output_flag[ i ] ) {
    InpIdx[ numOutputPics ] = i
    numOutputPics++
```

TABLE 6-continued

```
        }
        NumInpPicsInOutputTensor = numOutputPics
        if( pictureRateUpsamplingFlag )
          for( i = 0; i <= numInputPics − 2; i++ )
            numOutputPics += nnpfc__interpolated__pics[ i ]
```

The nnpfc_component_last_flag equal to 1 indicates that the last dimension in the input tensor inputTensor to the NNPF and the output tensor outputTensor resulting from the NNPF is used for a current channel. nnpfc_component_last_flag equal to 0 indicates that the third dimension in the input tensor inputTensor to the NNPF and the output tensor outputTensor resulting from the NNPF is used for a current channel.

The first dimension in the input tensor and in the output tensor is used for the batch index, which is a practice in some neural network frameworks. While formulae in the semantics of this SEI message use the batch size corresponding to the batch index equal to 0, it is up to the post-processing implementation to determine the batch size used as input to the neural network inference.

For example, when nnpfc_inp_order_idc is equal to 3 and nnpfc_auxiliary_inp_idc is equal to 1, there are 7 channels in the input tensor, including four luma matrices, two chroma matrices, and one auxiliary input matrix. In this case, the process DeriveInputTensors( ) would derive each of these 7 channels of the input tensor one by one, and when a particular channel of these channels is processed, that channel is referred to as the current channel during the process.

The nnpfc_inp_format_idc indicates the method of converting a sample value of the input picture to an input value to the NNPF. When nnpfc_inp_format_idc is equal to 0, the input values to the NNPF are real numbers and the functions InpY( ) and InpC( ) are specified as follows:

$$InpY(x) = x \div ((1 << BitDepth_Y) - 1) \qquad \text{[Equation 4]}$$

$$InpC(x) = x \div ((1 << BitDepth_C) - 1)$$

When nnpfc_inp_format_idc is equal to 1, the input values to the NNPF are unsigned integer numbers and the functions InpY( ) and InpC( ) are specified as follows:

The variable inpTensorBitDepthY is derived from the syntax element nnpfc_inp_tensor_luma_bitdepth_minus8 as specified below. The variable inpTensorBitDepthC is derived from the syntax element nnpfc_inp_tensor_chroma_bitdepth_minus8 as specified below.

Values of nnpfc_inp_format_idc greater than 1 are reserved for future specification by ITU-T|ISO/IEC and shall not be present in bitstreams conforming to this edition of this document. Decoders conforming to this edition of this document shall ignore NNPFC SEI messages that contain reserved values of nnpfc_inp_format_idc.

The nnpfc_auxiliary_inp_idc greater than 0 indicates that auxiliary input data is present in the input tensor of the NNPF. nnpfc_auxiliary_inp_idc equal to 0 indicates that auxiliary input data is not present in the input tensor. nnpfc_auxiliary_inp_idc equal to 1 specifies that auxiliary input data is derived as specified in Formula 85.

The value of nnpfc_auxiliary_inp_idc shall be in the range of 0 to 1, inclusive, in bitstreams conforming to this edition of this document. Values of 2 to 255, inclusive, for nnpfc_auxiliary_inp_idc are reserved for future use and shall not be present in bitstreams conforming to this edition of this document. Decoders conforming to this edition of this document shall ignore NNPFC SEI messages with nnpfc_auxiliary_inp_idc in the range of 2 to 255, inclusive. Values of nnpfc_auxiliary_inp_idc greater than 255 shall not be present in bitstreams conforming to this edition of this document and are not reserved for future use.

The nnpfc_inp_order_idc indicates the method of ordering the sample arrays of an input picture to form an input tensor to the NNPF.

The value of nnpfc_inp_order_idc shall be in the range of 0 to 3, inclusive, in bitstreams conforming to this edition of this document. Values of 4 to 255, inclusive, for nnpfc_inp_order_idc are reserved for future use by ITU-T|ISO/IEC and shall not be present in bitstreams conforming to this edition of this document. Decoders conforming to this edition of this document shall ignore NNPFC SEI messages with nnpfc_inp_order_idc in the range of 4 to 255, inclusive. Values of nnpfc_inp_order_idc greater than 255 shall not be present in bitstreams conforming to this edition of this document and are not reserved for future use.

When ChromaFormatIdc is not equal to 1, nnpfc_inp_order_idc shall not be equal to 3.

TABLE 7

```
shiftY = BitDepth_Y − inpTensorBitDepth_Y
if( inpTensorBitDepth_Y >= BitDepth_Y)
  InpY( x ) = x << ( inpTensorBitDepth_Y − BitDepth_Y )
else
  InpY( x ) = Clip3(0, ( 1 << inpTensorBitDepth_Y ) − 1, ( x + ( 1 << ( shiftY − 1 ) ) ) >> shiftY )
shiftC = BitDepth_C − inpTensorBitDepth_C
if( inpTensorBitDepth_C >= BitDepth_C )
  InpC( x ) = x << ( inpTensorBitDepth_C − BitDepth_C )
else
  InpC( x ) = Clip3(0, ( 1 << inpTensorBitDepth_C ) − 1, ( x + ( 1 << (shiftC − 1 ) ) ) >> shiftC )
```

When ChromaFormatIdc is equal to 0, nnpfc_inp_order_idc shall be equal to 0.

When chromaUpsamplingFlag is equal to 1, nnpfc_inp_order_idc shall not be equal to 0.

Table 8 contains an informative description of nnpfc_inp_order_idc values.

TABLE 8

Figure 12:
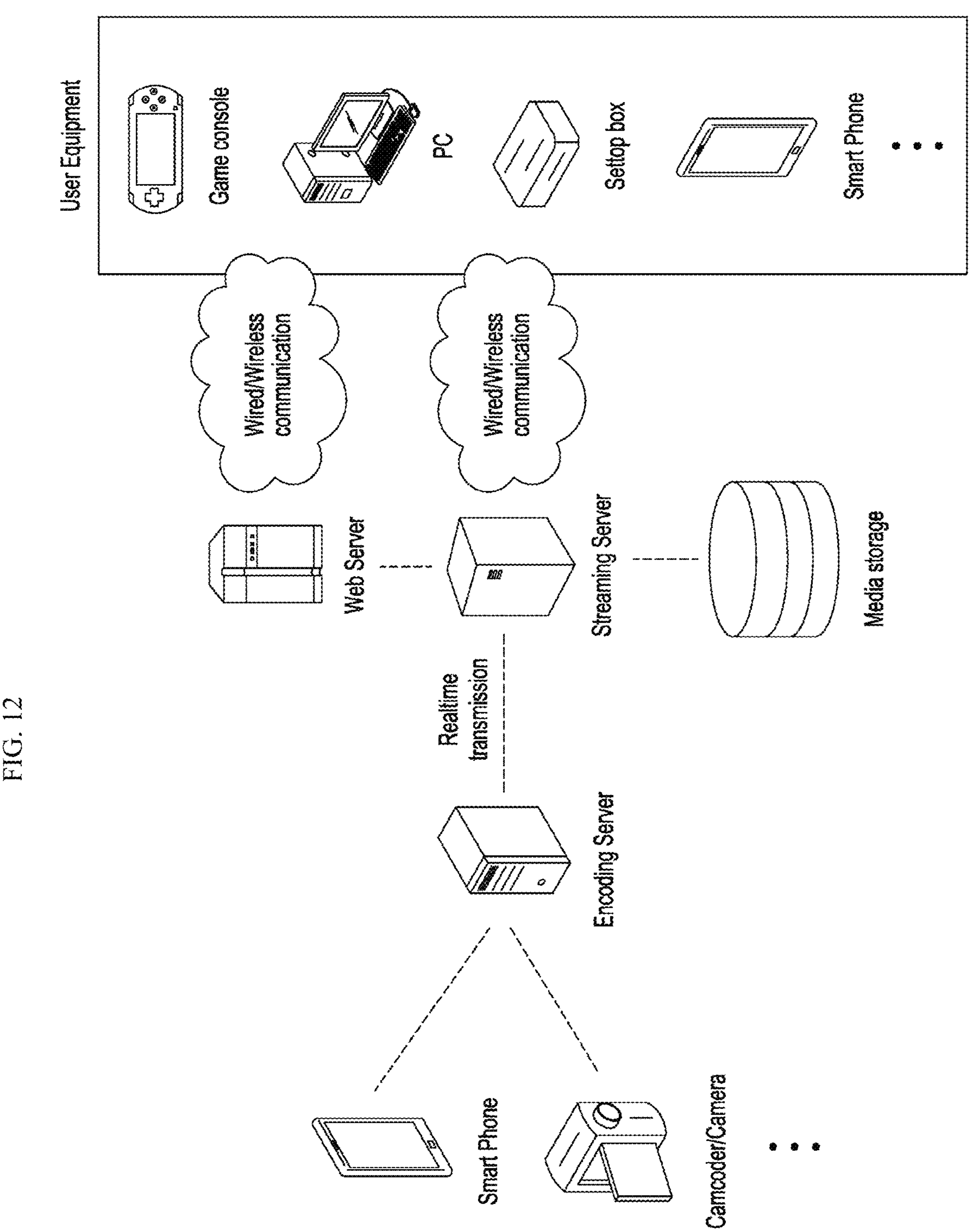
FIG. 12 is a diagram exemplifying a content streaming system to which an embodiment according to the present disclosure can be applied.

| nnpfc_inp_order_idc | Description |
|---|---|
| 0 | If nnpfc_auxiliary_inp_idc is equal to 0, one luma matrix is present in the input tensor for each input picture, and the number of channels is 1. Otherwise, when nnpfc_auxiliary_inp_idc is equal to 1, one luma matrix and one auxiliary input matrix are present, and the number of channels is 2. |
| 1 | If nnpfc_auxiliary_inp_idc is equal to 0, two chroma matrices are present in the input tensor, and the number of channels is 2. Otherwise, when nnpfc_auxiliary_inp_idc is equal to 1, two chroma matrices and one auxiliary input matrix are present, and the number of channels is 3. |
| 2 | If nnpfc_auxiliary_inp_idc is equal to 0, one luma and two chroma matrices are present in the input tensor, and the number of channels is 3. Otherwise, when nnpfc_auxiliary_inp_idc is equal to 1, one luma matrix, two chroma matrices and one auxiliary input matrix are present, and the number of channels is 4. |
| 3 | If nnpfc_auxiliary_inp_idc is equal to 0, four luma matrices and two chroma matrices are present in the input tensor, and the number of channels is 6. Otherwise, when nnpfc_auxiliary_inp_idc is equal to 1, four luma matrices, two chroma matrices, and one auxiliary input matrix are present in the input tensor, and the number of channels is 7. The luma channels are derived in an interleaved manner as illustrated in FIG. 12. This nnpfc_inp_order_idc can only be used when the input chroma format is 4:2:0. |
| 4 . . . 255 | Reserved |

The nnpfc_inp_tensor_luma_bitdepth_minus8 plus 8 specifies the bit depth of luma sample values in the input integer tensor. The value of inpTensorBitDepthY is derived as follows:

$$inpTensorBitDepth_Y = \text{nnpfc\_inp\_tensor\_luma\_bitdepth\_minus8} + 8 \quad \text{[Equation 5]}$$

It is a requirement of bitstream conformance that the value of nnpfc_inp_tensor_luma_bitdepth_minus8 shall be in the range of 0 to 24, inclusive.

The nnpfc_inp_tensor_chroma_bitdepth_minus8 plus 8 specifies the bit depth of chroma sample values in the input integer tensor. The value of inpTensorBitDepthC is derived as follows:

$$inpTensorBitDepth_C = \text{nnpfc\_inp\_tensor\_chroma\_bitdepth\_minus8} + 8 \quad \text{[Equation 6]}$$

It is a requirement of bitstream conformance that the value of nnpfc_inp_tensor_chroma_bitdepth_minus8 shall be in the range of 0 to 24, inclusive.

When nnpfc_auxiliary_inp_idc is equal to 1, the variable strengthControlScaledVal is derived as follows:

TABLE 9

```
for( i = 0; i < numInputPics; i++ )
  if( nnpfc_inp_format_idc = = 1 )
    if( nnpfc_inp_order_idc = = 0 | | nnpfc_inp_order_idc = = 2 | |
        nnpfc_inp_order_idc = = 3 )
      strengthControlScaledVal[ i ] =
          Floor ( StrengthControlVal[ i ] * ( ( 1 << inpTensorBitDepthY ) − 1 ) )
    else if( nnpfc_inp_order_idc = = 1 )
```

TABLE 9-continued

```
    strengthControlScaledVal[ i ] =
        Floor ( StrengthControlVal[ i ] * ( ( 1 << inpTensorBitDepthC ) − 1 ) )
else
    strengthControlScaledVal[ i ] = StrengthControlVal[ i ]
```

A patch is a rectangular array of samples from a component (e.g., a luma or chroma component) of a picture.

The process DeriveInputTensors( ), for deriving the input tensor inputTensor for a given vertical sample coordinate cTop and a horizontal sample coordinate cLeft specifying the top-left sample location for the patch of samples included in the input tensor, is specified as follows:

TABLE 10

```
for( i = 0; i < numInputPics; i++ ) {
  if( nnpfc_inp_order_idc = = 0 )
    for( yP = −nnpfc_overlap; yP < inpPatchHeight + nnpfc_overlap; yP++)
      for( xP = −nnpfc_overlap; xP < inpPatchWidth + nnpfc_overlap; xP++ ) {
        inpVal = InpY( InpSampleVal( cTop + yP, cLeft + xP, CroppedHeight,
          CroppedWidth, CroppedYPic[ i ], 0 ) )
        yPovlp = yP + nnpfc_overlap
        xPovlp = xP + nnpfc_overlap
        if( !nnpfc_component_last_flag )
          inputTensor[ 0 ][ i ][ 0 ][ yPovlp ][ xPovlp ] = inpVal
        else
          inputTensor[ 0 ][ i ][ yPovlp ][ xPovlp ][ 0 ] = inpVal
        if( nnpfc_auxiliary_inp_idc = = 1 )
          if( !nnpfc_component_last_flag )
            inputTensor[ 0 ][ i ][ 1 ][ yPovlp ][ xPovlp ] = strengthControlScaledVal[ i ]
          else
            inputTensor[ 0 ][ i ][ yPovlp ][ xPovlp ][ 1 ] = strengthControlScaledVal[ i ]
      }
  else if( nnpfc_inp_order_idc = = 1 )
    for( yP = −nnpfc_overlap; yP < inpPatchHeight + nnpfc_overlap; yP++)
      for( xP = −nnpfc_overlap; xP < inpPatchWidth + nnpfc_overlap; xP++ ) {
        inpCbVal = InpC( InpSampleVal( cTop + yP, cLeft + xP, CroppedHeight / SubHeightC,
          CroppedWidth / SubWidthC, CroppedCbPic[ i ], 1 ) )
        inpCrVal = InpC( InpSampleVal( cTop + yP, cLeft + xP, CroppedHeight / SubHeightC,
          CroppedWidth / SubWidthC, CroppedCrPic[ i ], 2 ) )
        yPovlp = yP + nnpfc_overlap
        xPovlp = xP + nnpfc_overlap
        if( !nnpfc_component_last_flag ) {
          inputTensor[ 0 ][ i ][ 0 ][ yPovlp ][ xPovlp ] = inpCbVal
          inputTensor[ 0 ][ i ][ 1 ][ yPovlp ][ xPovlp ] = inpCrVal
        } else {
          inputTensor[ 0 ][ i ][ yPovlp ][ xPovlp ][ 0 ] = inpCbVal
          inputTensor[ 0 ][ i ][ yPovlp ][ xPovlp ][ 1 ] = inpCrVal
        }
        if( nnpfc_auxiliary_inp_idc = = 1 )
          if( !nnpfc_component_last_flag )
            inputTensor[ 0 ][ i ][ 2 ][ yPovlp ][ xPovlp ] = strengthControlScaledVal[ i ]
          else
            inputTensor[ 0 ][ i ][ yPovlp ][ xPovlp ][ 2 ] = strengthControlScaledVal[ i ]
      }
```

TABLE 11

```
else if( nnpfc_inp_order_idc = = 2 )
  for( yP = −nnpfc_overlap; yP < inpPatchHeight + nnpfc_overlap; yP++)
    for( xP = −nnpfc_overlap; xP < inpPatchWidth + nnpfc_overlap; xP++ ) {
      yY = cTop + yP
      xY = cLeft + xP
      yC = yY / SubHeightC
      xC = xY / SubWidthC
      inpYVal = InpY( InpSampleVal( yY, xY, CroppedHeight,
        CroppedWidth, CroppedYPic[ i ], 0 ) )
      inpCbVal = InpC( InpSampleVal( yC, xC, CroppedHeight / SubHeightC,
        CroppedWidth / SubWidthC, CroppedCbPic[ i ], 1 ) )
      inpCrVal = InpC( InpSampleVal( yC, xC, CroppedHeight / SubHeightC,
        CroppedWidth / SubWidthC, CroppedCrPic[ i ], 2 ) )
      yPovlp = yP + nnpfc_overlap
```

TABLE 11-continued

```
        xPovlp = xP + nnpfc_overlap
        if( !nnpfc_component_last_flag ) {
          inputTensor[ 0 ][ i ][ 0 ][ yPovlp ][ xPovlp ] = inpYVal
          inputTensor[ 0 ][ i ][ 1 ][ yPovlp ][ xPovlp ] = inpCbVal
          inputTensor[ 0 ][ i ][ 2 ][ yPovlp ][ xPovlp ] = inpCrVal
        } else {
          inputTensor[ 0 ][ i ][ yPovlp ][ xPovlp ][ 0 ] = inpYVal
          inputTensor[ 0 ][ i ][ yPovlp ][ xPovlp ][ 1 ] = inpCbVal
          inputTensor[ 0 ][ i ][ yPovlp ][ xPovlp ][ 2 ] = inpCrVal
        }
        if( nnpfc_auxiliary_inp_idc = = 1 )
          if( !nnpfc_component_last_flag )
            inputTensor[ 0 ][ i ][ 3 ][ yPovlp ][ xPovlp ] = strengthControlScaledVal[ i ]
          else
            inputTensor[ 0 ][ i ][ yPovlp ][ xPovlp ][ 3 ] = strengthControlScaledVal[ i ]
      }
```

TABLE 12

```
else if( nnpfc_inp_order_idc = = 3 )
  for( yP = −nnpfc_overlap; yP < inpPatchHeight + nnpfc_overlap; yP++)
    for( xP = −nnpfc_overlap; xP < inpPatchWidth + nnpfc_overlap; xP++ ) {
      yTL = cTop + yP * 2
      xTL = cLeft + xP * 2
      yBR = yTL + 1
      xBR = xTL + 1
      yC = cTop / 2 + yP
      xC = cLeft / 2 + xP
      inpTLVal = InpY( InpSampleVal( yTL, xTL, CroppedHeight,
        CroppedWidth, CroppedYPic[ i ], 0 ) )
      inpTRVal = InpY( InpSampleVal( yTL, xBR, CroppedHeight,
        CroppedWidth, CroppedYPic[ i ], 0 ) )
      inpBLVal = InpY( InpSampleVal( yBR, xTL, CroppedHeight,
        CroppedWidth, CroppedYPic[ i ], 0 ) )
      inpBRVal = InpY( InpSampleVal( yBR, xBR, CroppedHeight,
        CroppedWidth, CroppedYPic[ i ], 0 ) )
      inpCbVal = InpC( InpSampleVal( yC, xC, CroppedHeight / 2,
        CroppedWidth / 2, CroppedCbPic[ i ], 1 ) )
      inpCrVal = InpC( InpSampleVal( yC, xC, CroppedHeight / 2,
        CroppedWidth / 2, CroppedCrPic[ i ], 2 ) )
      yPovlp = yP + nnpfc_overlap
      xPovlp = xP + nnpfc_overlap
      if( !nnpfc_component_last_flag ) {
        inputTensor[ 0 ][ i ][ 0 ][ yPovlp ][ xPovlp ] = inpTLVal
        inputTensor[ 0 ][ i ][ 1 ][ yPovlp ][ xPovlp ] = inpTRVal
        inputTensor[ 0 ][ i ][ 2 ][ yPovlp ][ xPovlp ] = inpBLVal
        inputTensor[ 0 ][ i ][ 3 ][ yPovlp ][ xPovlp ] = inpBRVal
        inputTensor[ 0 ][ i ][ 4 ][ yPovlp ][ xPovlp ] = inpCbVal
        inputTensor[ 0 ][ i ][ 5 ][ yPovlp ][ xPovlp ] = inpCrVal
      } else {
        inputTensor[ 0 ][ i ][ yPovlp ][ xPovlp ][ 0 ] = inpTLVal
        inputTensor[ 0 ][ i ][ yPovlp ][ xPovlp ][ 1 ] = inpTRVal
        inputTensor[ 0 ][ i ][ yPovlp ][ xPovlp ][ 2 ] = inpBLVal
        inputTensor[ 0 ][ i ][ yPovlp ][ xPovlp ][ 3 ] = inpBRVal
        inputTensor[ 0 ][ i ][ yPovlp ][ xPovlp ][ 4 ] = inpCbVal
        inputTensor[ 0 ][ i ][ yPovlp ][ xPovlp ][ 5 ] = inpCrVal
      }
      if( nnpfc_auxiliary_inp_idc = = 1 )
        if( !nnpfc_component_last_flag )
          inputTensor[ 0 ][ i ][ 6 ][ yPovlp ][ xPovlp ] = strengthControlScaledVal[ i ]
        else
          inputTensor[ 0 ][ i ][ yPovlp ][ xPovlp ][ 6 ] = strengthControlScaledVal[ i ]
    }
  }
```

The nnpfc_out_format_idc equal to 0 indicates that the sample values output by the NNPF are real numbers where the value range of 0 to 1, inclusive, maps linearly to the unsigned integer value range of 0 to (1<<bitDepth)-1, inclusive, for any desired bit depth bitDepth for subsequent post-processing or displaying.

The nnpfc_out_format_idc equal to 1 indicates that the luma sample values output by the NNPF are unsigned integer numbers in the range of 0 to (1<<outTensorBitDepthY)-1, inclusive, and the chroma sample values output by the NNPF are unsigned integer numbers in the range of 0 to (1<<outTensorBitDepthC)-1, inclusive.

Values of nnpfc_out_format_idc greater than 1 are reserved for future specification by ITU-T|ISO/IEC and shall not be present in bitstreams conforming to this edition of this document. Decoders conforming to this edition of this document shall ignore NNPFC SEI messages that contain reserved values of nnpfc_out_format_idc.

The nnpfc_out_order_idc indicates the output order of samples resulting from the NNPF.

The value of nnpfc_out_order_idc shall be in the range of 0 to 3, inclusive, in bitstreams conforming to this edition of this document. Values of 4 to 255, inclusive, for nnpfc_out_order_idc are reserved for future use by ITU-T|ISO/IEC and shall not be present in bitstreams conforming to this edition of this document. Decoders conforming to this edition of this document shall ignore NNPFC SEI messages with nnpfc_out_order_idc in the range of 4 to 255, inclusive. Values of nnpfc_out_order_idc greater than 255 shall not be present in bitstreams conforming to this edition of this document and are not reserved for future use.

When chromaUpsamplingFlag is equal to 1, nnpfc_out_order_idc shall not be equal to 0 or 3.

When colourizationFlag is equal to 1, nnpfc_out_order_idc shall not be equal to 0.

Table 13 contains an informative description of nnpfc_out_order_idc values.

TABLE 13

| nnpfc_out_order_idc | Description |
|---|---|
| 0 | Only the luma matrix is present in the output tensor, thus the number of channels is 1. |
| 1 | Only the chroma matrices are present in the output tensor, thus the number of channels is 2. |
| 2 | The luma and chroma matrices are present in the output tensor, thus the number of channels is 3. |
| 3 | Four luma matrices and two chroma matrices are present in the output tensor, thus the number of channels is 6. This nnpfc_out_order_idc can only be used when the output chroma format is 4:2:0. |
| 4 . . . 255 | Reserved |

The nnpfc_outLtensor_luma_bitdepth_minus8 plus 8 specifies the bit depth of luma sample values in the output integer tensor. The value of nnpfc_out_tensor_luma_bitdepth_minus8 shall be in the range of 0 to 24, inclusive. The value of outTensorBitDepthY is derived as follows:

$$outTensorBitDepth_Y = \text{nnpfc\_out\_tensor\_luma\_bitdepth\_minus8} + 8 \quad \text{[Equation 7]}$$

The nnpfc_out_tensor_chroma_bitdepth_minus8 plus 8 specifies the bit depth of chroma sample values in the output integer tensor. The value of nnpfc_out_tensor_chroma_bitdepth_minus8 shall be in the range of 0 to 24, inclusive. The value of outTensorBitDepthC is derived as follows:

$$outTensorBitDepth_C = \text{nnpfc\_out\_tensor\_chroma\_bitdepth\_minus8} + 8 \quad \text{[Equation 8]}$$

When bitDepthUpsamplingFlag is equal to 1, the value of nnpfc_out_format_idc shall be equal to 1 and at least one of the following conditions shall be true:

The nnpfc_out_tensor_luma_bitdepth_minus8 is present and outTensorBitDepthY is greater than BitDepthY.

The nnpfc_out_tensor_chroma_bitdepth_minus8 is present and outTensorBitDepthC is greater than BitDepthC.

When nnpfc_inp_tensor_luma_bitdepth_minus8, nnpfc_inp_tensor_chroma_bitdepth_minus8, nnpfc_out_tensor_luma_bitdepth_minus8, and nnpfc_out_tensor_chroma_bitdepth_minus8 are present and outTensorBitDepthY is greater than inpTensorBitDepthY, outTensorBitDepthC shall not be less than inpTensorBitDepthC.

When nnpfc_inp_tensor_luma_bitdepth_minus8, nnpfc_inp_tensor_chroma_bitdepth_minus8, nnpfc_out_tensor_luma_bitdepth_minus8, and nnpfc_out_tensor_chroma_bitdepth_minus8 are present and outTensorBitDepthC is greater than inpTensorBitDepthC, outTensorBitDepthY shall not be less than inpTensorBitDepthY.

The process StoreOutputTensors( ), for deriving sample values in the filtered output sample arrays FilteredYPic, FilteredCbPic, and FilteredCrPic from the output tensor outputTensor for a given vertical sample coordinate cTop and a horizontal sample coordinate cLeft specifying the top-left sample location for the patch of samples included in the input tensor, is specified as follows:

TABLE 14

```
for( i = 0; i < numOutputPics; i++ ) {
  if( nnpfc_out_order_idc = = 0 )
    for( yP = 0; yP < outPatchHeight; yP++)
      for( xP = 0; xP < outPatchWidth; xP++ ) {
        yY = cTop * outPatchHeight / inpPatchHeight + yP
        xY = cLeft * outPatchWidth / inpPatchWidth + xP
        if ( yY < nnpfcOutputPicHeight && xY < nnpfcOutputPicWidth )
          if( !nnpfc_component_last_flag )
```

TABLE 14-continued

```
                FilteredYPic[ i ][ xY ][yY ] = outputTensor[ 0 ][ i ][ 0 ][ yP ][ xP ]
              else
                FilteredYPic[ i ][ xY ][ yY ] = outputTensor[ 0 ][ i ][ yP ][ xP ][ 0 ]
  }
  else if( nnpfc_out_order_idc = = 1 )
    for( yP = 0; yP < outPatchCHeight; yP++)
      for( xP = 0; xP < outPatchCWidth; xP++ ) {
        xSrc = cLeft * horCScaling + xP
        ySrc = cTop * verCScaling + yP
        if ( ySrc < nnpfcOutputPicHeight / outSubHeightC &&
            xSrc < nnpfcOutputPicWidth / outSubWidthC )
          if( !nnpfc_component_last_flag ) {
            FilteredCbPic[ i ][ xSrc ][ ySrc ] = outputTensor[ 0 ][ i ][ 0 ][ yP ][ xP ]
            FilteredCrPic[ i ][ xSrc ][ ySrc ] = outputTensor[ 0 ][ i ][ 1 ][ yP ][ xP ]
          } else {
            FilteredCbPic[ i ][ xSrc ][ ySrc ] = outputTensor[ 0 ][ i ][ yP ][ xP ][ 0 ]
            FilteredCrPic[ i ][ xSrc ][ ySrc ] = outputTensor[ 0 ][ i ][ yP ][ xP ][ 1 ]
          }
      }
  else if( nnpfc_out_order_idc = = 2 )
    for( yP = 0; yP < outPatchHeight; yP++)
      for( xP = 0; xP < outPatchWidth; xP++ ) {
        yY = cTop * outPatchHeight / inpPatchHeight + yP
        xY = cLeft * outPatchWidth / inpPatchWidth + xP
        yC = yY / outSubHeightC
        xC = xY / outSubWidthC
        yPc = ( yP / outSubHeightC ) * outSubHeightC
        xPc = ( xP / outSubWidthC) * outSubWidthC
```

TABLE 15

```
        if ( yY < nnpfcOutputPicHeight && xY < nnpfcOutputPicWidth )
          if( !nnpfc_component_last_flag ) {
            FilteredYPic[ i ][ xY ][ yY ] = outputTensor[ 0 ][ i ][ 0 ][ yP ][ xP ]
            FilteredCbPic[ i ][ xC ][ yC ] = outputTensor[ 0 ][ i ][ 1 ][ yPc ][ xPc ]
            FilteredCrPic[ i ][ xC ][ yC ] = outputTensor[ 0 ][ i ][ 2 ][ yPc ][ xPc ]
          } else {
            FilteredYPic[ i ][ xY ][ yY ] = outputTensor[ 0 ][ i ][ yP ][ xP ][ 0 ]
            FilteredCbPic[ i ][ xC ][ yC ] = outputTensor[ 0 ][ i ][ yPc ][ xPc ][ 1 ]
            FilteredCrPic[ i ][ xC ][ yC ] = outputTensor[ 0 ][ i ][ yPc ][ xPc ][ 2 ]
          }
    }
else if( nnpfc_out_order_idc = = 3 )
  for( yP = 0; yP < outPatchHeight; yP++ )
    for( xP = 0; xP < outPatchWidth; xP++ ) {
      ySrc = cTop / 2 * outPatchHeight / inpPatchHeight + yP
      xSrc = cLeft / 2 * outPatchWidth / inpPatchWidth + xP
      if ( ySrc < nnpfcOutputPicHeight / 2 &&
            xSrc < nnpfcOutputPicWidth / 2 )
        if( !nnpfc_component_last_flag ) {
          FilteredYPic[ i ][ xSrc * 2 ][ ySrc * 2 ] = outputTensor[ 0 ][ i ][ 0 ][ yP ][ xP ]
          FilteredYPic[ i ][ xSrc * 2 + 1 ][ ySrc * 2 ] = outputTensor[ 0 ][ i ][ 1 ][ yP ][ xP ]
          FilteredYPic[ i ][ xSrc * 2 ][ ySrc * 2 + 1 ] = outputTensor[ 0 ][ i ][ 2 ][ yP ][ xP ]
          FilteredYPic[ i ][ xSrc * 2 + 1][ ySrc * 2 + 1 ] = outputTensor[ 0 ][ i ][ 3 ][ yP ][ xP ]
          FilteredCbPic[ i ][ xSrc ][ ySrc ] = outputTensor[ 0 ][ i ][ 4 ][ yP ][ xP ]
          FilteredCrPic[ i ][ xSrc ][ ySrc ] = outputTensor[ 0 ][ i ][ 5 ][ yP ][ xP ]
        } else {
          FilteredYPic[ i ][ xSrc * 2 ][ ySrc * 2 ] = outputTensor[ 0 ][ i ][ yP ][ xP ][ 0 ]
          FilteredYPic[ i ][ xSrc * 2 + 1 ][ ySrc * 2 ] = outputTensor[ 0 ][ i ][ yP ][ xP ][ 1 ]
          FilteredYPic[ i ][ xSrc * 2 ][ ySrc * 2 + 1 ] = outputTensor[ 0 ][ i ][ yP ][ xP ][ 2 ]
          FilteredYPic[ i ][ xSrc * 2 + 1][ ySrc * 2 + 1 ] = outputTensor[ 0 ][ i ][ yP ][ xP ][ 3 ]
          FilteredCbPic[ i ][ xSrc ][ ySrc ] = outputTensor[ 0 ][ i ][ yP ][ xP ][ 4 ]
          FilteredCrPic[ i ][ xSrc ][ ySrc ] = outputTensor[ 0 ][ i ][ yP ][ xP ][ 5 ]
        }
    }
}
```

The nnpfc_separate_colour_description_present_flag equal to 1 indicates that a distinct combination of colour primaries, transfer characteristics, matrix coefficients, and scaling and offset values applied in association with the matrix coefficients for the picture resulting from the NNPF is specified in the SEI message syntax structure. nnpfc_separate_colour_description_present_flag equal to 0 indicates that the combination of colour primaries, transfer characteristics, matrix coefficients, and scaling and offset values applied in association with the matrix coefficients for the picture resulting from the NNPF is the same as indicated in VUI parameters for the CLVS.

The nnpfc_colour_primaries has the same semantics as specified in subclause 7.3 for the vui_colour_primaries syntax element, except as follows:

The nnpfc_colour_primaries specifies the colour primaries of the picture resulting from applying the NNPF specified in the SEI message, rather than the colour primaries used for the CLVS.

When nnpfc_colour_primaries is not present in the NNPFC SEI message, the value of nnpfc_colour_primaries is inferred to be equal to vui_colour_primaries.

The nnpfc_transfer_characteristics has the same semantics as specified in subclause 7.3 for the vui_transfer_characteristics syntax element, except as follows:

The nnpfc_transfer_characteristics specifies the transfer characteristics of the picture resulting from applying the NNPF specified in the SEI message, rather than the transfer characteristics used for the CLVS.

When nnpfc_transfer_characteristics is not present in the NNPFC SEI message, the value of nnpfc_transfer_characteristics is inferred to be equal to vui_transfer_characteristics.

The nnpfc_matrix_coeffs describes the equations used in deriving luma and chroma signals from the green, blue, and red, or Y, Z, and X primaries. Its semantics apply to the pictures resulting from applying the NNPF specified in this SEI message and are as specified for MatrixCoefficients in Rec. ITU-T H.273|ISO/IEC 23091-2 with BitDepthY and BitDepthC being equal to outTensorBitDepthY and outTensorBitDepthC, respectively.

When nnpfc_matrix_coeffs is not present in the NNPFC SEI message, the value of nnpfc_matrix_coeffs is inferred to be equal to vui_matrix_coeffs.

The nnpfc_matrix_coeffs shall not be equal to 0 unless both of the following conditions are true:

The nnpfc_out_tensor_chroma_bitdepth_minus8 is equal to nnpfc_out_tensor_luma_bitdepth_minus8.

The nnpfc_out_order_idc is equal to 2, outSubHeightC is equal to 1, and outSubWidthC is equal to 1.

The nnpfc_matrix_coeffs shall not be equal to 8 unless one of the following conditions is true:

The nnpfc_out_tensor_chroma_bitdepth_minus8 is equal to nnpfc_out_tensor_luma_bitdepth_minus8.

The nnpfc_out_tensor_chroma_bitdepth_minus8 is equal to nnpfc_out_tensor_luma_bitdepth_minus8+1, nnpfc_out_order_idc is equal to 2, outSubHeightC is equal to 1, and outSubWidthC is equal to 1.

The nnpfc_full_range_flag indicates the scaling and offset values applied in association with the matrix coefficients as specified by nnpfc_matrix_coeffs. Its semantics are as specified for the VideoFullRangeFlag parameter in Rec. ITU-T H.273|ISO/IEC 23091-2. When not present, the value of nnpfc_full_range_flag is inferred to be equal to 0.

The nnpfc_chroma_loc_info_present_flag equal to 1 indicates the presence of the nnpfc_chroma_sample_loc_type_frame syntax element in the NNPFC SEI message. nnpfc_chroma_loc_info_present_flag equal to 0 indicates the absence of the nnpfc_chroma_sample_loc_type_frame syntax element in the NNPFC SEI message. When colourizationFlag is equal to 0 or nnpfc_out_colour_format_idc is not equal to 1, the value of nnpfc_chroma_loc_info_present_flag shall be equal to 0.

The nnpfc_chroma_sample_loc_type_frame, when not equal to 6 and nnpfc_out_colour_format_idc is equal to 1, specifies the location of chroma samples of the output pictures, as shown in FIG. 1. nnpfc_chroma_sample_loc_type_frame equal to 6 and nnpfc_out_colour_format_idc equal to 1 indicates that the location of the chroma samples is unknown or unspecified or specified by other means not specified in this document. The value of nnpfc_chroma_sample_loc_type_frame shall be in the range of 0 to 6, inclusive.

The nnpfc_overlap indicates the overlapping horizontal and vertical sample counts of adjacent input tensors of the NNPF. The value of nnpfc_overlap shall be in the range of 0 to 16383, inclusive. nnpfc_constant_patch_size_flag equal to 1 indicates that the NNPF accepts exactly the patch size indicated by nnpfc_patch_width_minus1 and nnpfc_patch_height_minus1 as input. nnpfc_constant_patch_size_flag equal to 0 indicates that the NNPF accepts as input any patch size with width inpPatchWidth and height inpPatchHeight such that the width of an extended patch (i.e., a patch plus the overlapping area), which is equal to inpPatchWidth+2*nnpfc_overlap, is a positive integer multiple of nnpfc_extended_patch_width_cd_delta_minus1+1+2*nnpfc_overlap, and the height of the extended patch, which is equal to inpPatchHeight+2*nnpfc_overlap, is a positive integer multiple of nnpfc_extended_patch_height_cd_delta_minus1+1+2*nnpfc_overlap.

The nnpfc_patch_width_minus1 plus 1, when nnpfc_constant_patch_size_flag equal to 1, indicates the horizontal sample counts of the patch size required for the input to the NNPF. The value of nnpfc_patch_width_minus1 shall be in the range of 0 to Min(32 766, CroppedWidth-1), inclusive.

The nnpfc_patch_height_minus1 plus 1, when nnpfc_constant_patch_size_flag equal to 1, indicates the vertical sample counts of the patch size required for the input to the NNPF. The value of nnpfc_patch_height_minus1 shall be in the range of 0 to Min(32 766, CroppedHeight-1), inclusive.

The nnpfc_extended_patch_width_cd_delta_minus1 plus 1 plus 2*nnpfc_overlap, when nnpfc_constant_patch_size_flag equal to 0, indicates a common divisor of all allowed values of the width of an extended patch required for the input to the NNPF. The value of nnpfc_extended_patch_width_cd_delta_minus1 shall be in the range of 0 to Min(32 766, CroppedWidth-1), inclusive.

The nnpfc_extended_patch_height_cd_delta_minus1 plus 1 plus 2*nnpfc_overlap, when nnpfc_constant_patch_size_flag equal to 0, indicates a common divisor of all allowed values of the height of an extended patch required for the input to the NNPF. The value of nnpfc_extended_patch_height_cd_delta_minus1 shall be in the range of 0 to Min(32 766, CroppedHeight-1), inclusive.

Let the variables inpPatchWidth and inpPatchHeight be the patch size width and the patch size height, respectively.

If nnpfc_constant_patch_size_flag is equal to 0, the following applies:

The values of inpPatchWidth and inpPatchHeight are either provided by external means not specified in this document or set by the post-processor itself.

The value of inpPatchWidth+2*nnpfc_overlap shall be a positive integer multiple ofnnpfc_extended_patch_width_cd_delta_minus1+1+2*nnpfc_overlap and inpPatchWidth shall be less than or equal to CroppedWidth. The value of inpPatchHeight+2*nnpfc_overlap shall be a positive integer multiple ofnnpfc_extended_patch_height_cd_delta_minus1+1+2*nnpfc_overlap and inpPatchHeight shall be less than or equal to CroppedHeight.

Otherwise (nnpfc_constant_patch_size_flag is equal to 1), the value of inpPatchWidth is set equal to nnpfc_patch_width_minus1+1 and the value of inpPatchHeight is set equal to nnpfc_patch_height_minus1+1.

The variables outPatchWidth, outPatchHeight, horCScaling, verCScaling, outPatchCWidth, and outPatchCHeight are derived as follows:

TABLE 16

```
outPatchWidth = ( nnpfcOutputPicWidth * inpPatchWidth ) / CroppedWidth
outPatchHeight = ( nnpfcOutputPicHeight * inpPatchHeight ) / CroppedHeight
horCScaling = SubWidthC / outSubWidthC
verCScaling = SubHeightC / outSubHeightC
outPatchCWidth = outPatchWidth * horCScaling
outPatchCHeight = outPatchHeight * verCScaling
```

It is a requirement of bitstream conformance that outPatchWidth*CroppedWidth shall be equal to nnpfcOutputPicWidth*inpPatchWidth and outPatchHeight*CroppedHeight shall be equal to nnpfcOutputPicHeight*inpPatchHeight.

The nnpfc_padding_type indicates the process of padding when referencing sample locations outside the boundaries of the input picture as described in Table 17. The value of nnpfc_padding_type shall be in the range of 0 to 4, inclusive, in bitstreams conforming to this edition of this document. Values of 5 to 15, inclusive, for nnpfc_padding_type are reserved for future use and shall not be present in bitstreams conforming to this edition of this document. Decoders conforming to this edition of this document shall ignore NNPFC SEI messages with nnpfc_padding_type in the range of 5 to 15, inclusive. Values of nnpfc_padding_type greater than 15 shall not be present in bitstreams conforming to this edition of this document and are not reserved for future use.

TABLE 17

| nnpfc_padding_type | Description |
|---|---|
| 0 | Zero padding |
| 1 | Replication padding |
| 2 | Reflection padding |
| 3 | Wrap-around padding |
| 4 | Fixed padding |
| 5 . . . 15 | reserved |

The nnpfc_luma_padding_val indicates the luma value to be used for padding when nnpfc_padding_type is equal to 4. The value of nnpfc_luma_padding_val shall be in the range of 0 to (1<<BitDepthY)-1, inclusive.

The nnpfc_cb_padding_val indicates the Cb value to be used for padding when nnpfc_padding_type is equal to 4. The value of nnpfc_cb_padding_val shall be in the range of 0 to (1<BitDepthC)-1, inclusive.

The nnpfc_cr_padding_val indicates the Cr value to be used for padding when nnpfc_padding_type is equal to 4. The value of nnpfc_cr_padding_val shall be in the range of 0 to (1<BitDepthC)-1, inclusive.

The function InpSampleVal(y, x, picHeight, picWidth, croppedPic, cIdx) with inputs being a vertical sample location y, a horizontal sample location x, a picture height picHeight, a picture width picWidth, sample array croppedPic, and component index cIdx (equal to 0 for luma, 1 for Cb, and 2 for Cr) returns the value of sampleVal derived as follows:

For the inputs to the function InpSampleVal( ), the vertical location is listed before the horizontal location for compatibility with input tensor conventions of some inference engines.

TABLE 18

```
if( nnpfc_padding_type = = 0 )
  if( y < 0 | | x < 0 | | y >= picHeight | | x >= picWidth )
    sampleVal = 0
  else
    sampleVal = croppedPic[ x ][ y ]
else if( nnpfc_padding_type = = 1 )
  sampleVal = croppedPic[ Clip3( 0, picWidth − 1, x ) ][ Clip3( 0, picHeight − 1, y ) ]
else if( nnpfc_padding_type = = 2 )
  sampleVal = croppedPic[ Reflect( picWidth − 1, x ) ][ Reflect( picHeight − 1, y ) ]
else if( nnpfc_padding_type = = 3 )
  if( y >= 0 && y < picHeight )
    sampleVal = croppedPic[ Wrap( picWidth − 1, x ) ][ y ]
else if( nnpfc_padding_type = = 4 )
  if( y < 0 | | x < 0 | | y >= picHeight | | x > picWidth )
    sampleVal = ( cIdx = = 0 ? nnpfc_luma_padding_val :
      ( cIdx = = 1 ? nnpfc_cb_padding_val : nnpfc_cr_padding_val ) )
  else
    sampleVal = croppedPic[ x ][ y ]
```

An NNPF PostProcessingFilter( ) is the target NNPF as derived in the semantics of the NNPFA SEI message. The following example process may be used, with the NNPF PostProcessingFilter( ), to generate, in a patch-wise manner, the filtered and/or interpolated picture(s), which contain Y, Cb, and Cr sample arrays FilteredYPic, FilteredCbPic, and FilteredCrPic, respectively, as indicated by nnpfc_out_order_idc:

TABLE 19

```
if( nnpfc_inp_order_idc = = 0 | | nnpfc_inp_order_idc = = 2 )
  for( cTop = 0; cTop < CroppedHeight; cTop += inpPatchHeight )
    for( cLeft = 0; cLeft < CroppedWidth; cLeft += inpPatchWidth ) {
      DeriveInputTensors( )
      outputTensor = PostProcessingFilter( inputTensor )
      StoreOutputTensors( )
    }
else if( nnpfc_inp_order_idc = = 1 )
  for( cTop = 0; cTop < CroppedHeight / SubHeightC; cTop += inpPatchHeight )
    for( cLeft = 0; cLeft < CroppedWidth / SubWidthC; cLeft += inpPatchWidth ) {
      DeriveInputTensors( )
      outputTensor = PostProcessingFilter( inputTensor )
      StoreOutputTensors( )
    }
else if( nnpfc_inp_order_idc = = 3 )
  for( cTop = 0; cTop < CroppedHeight; cTop += inpPatchHeight * 2 )
    for( cLeft = 0; cLeft < CroppedWidth; cLeft += inpPatchWidth * 2 ) {
```

TABLE 19-continued

```
    DeriveInputTensors( )
    outputTensor = PostProcessingFilter( inputTensor )
    StoreOutputTensors( )
  }
```

An NNPF-generated picture with index i contains sample arrays FilteredYPic[i], FilteredCbPic[i], and FilteredCrPic [i], when present, that are derived by Formula 99. An NNPF-generated picture does not include the overlap regions.

The NNPF process consists of the process defined by Formula 99 followed by outputting NNPF-generated pictures in their increasing index order, where all NNPF-generated pictures that were interpolated by the NNPF are output and those NNPF-generated pictures that correspond to any input pictures to the NNPF are output as specified in the semantics of the NNPFA SEI message.

The nnpfc_complexity_info_present_flag equal to 1 specifies that one or more syntax elements that indicate the complexity of the NNPF associated with the nnpfc_id are present. nnpfc_complexity_info_present_flag equal to 0 specifies that no syntax elements that indicates the complexity of the NNPF associated with the nnpfc_id are present.

The nnpfc_parameter_type_idc equal to 0 indicates that the neural network uses only integer parameters. nnpfc_parameter_type_fag equal to 1 indicates that the neural network may use floating point or integer parameters. nnpfc_parameter_type_idc equal to 2 indicates that the neural network uses only binary parameters. nnpfc_parameter_type_idc equal to 3 is reserved for future use by ITU-T|ISO/IEC and shall not be present in bitstreams conforming to this edition of this document. Decoders conforming to this edition of this document shall ignore NNPFC SEI messages with nnpfc_parameter_type_idc equal to 3.

The nnpfc_log 2_parameter_bit_length_minus3 equal to 0, 1, 2, and 3 indicates that the neural network does not use parameters of bit length greater than 8, 16, 32, and 64, respectively. When nnpfc_parameter_type_idc is present and nnpfc_log 2_parameter_bit_length_minus3 is not present, the neural network does not use parameters of bit length greater than 1.

The nnpfc_num_parameters_idc indicates the maximum number of neural network parameters for the NNPF in units of a power of 2 048. nnpfc_num_parameters_idc equal to 0 indicates that the maximum number of neural network parameters is unknown. The value nnpfc_num_parameters_idc shall be in the range of 0 to 52, inclusive. Values of nnpfc_num_parameters_idc greater than 52 are reserved for future use by ITU-T|ISO/IEC and shall not be present in bitstreams conforming to this edition of this document. Decoders conforming to this edition of this document shall ignore NNPFC SEI messages with nnpfc_num_parameters_idc greater than 52.

If the value of nnpfc_num_parameters_idc is greater than zero, the variable maxNumParameters is derived as follows:

$$maxNumParameters = (2048 << \text{nnpfc\_num\_parameters\_idc}) - 1 \quad \text{[Equation 9]}$$

It is a requirement of bitstream conformance that the number of neural network parameters of the NNPF shall be less than or equal to maxNumParameters.

The nnpfc_num_kmac_operations_idc greater than 0 indicates that the maximum number of multiply-accumulate operations per sample of the NNPF is less than or equal to nnpfc_num_kmac_operations_idc*1 000. nnpfc_num_kmac_operations_idc equal to 0 indicates that the maximum number of multiply-accumulate operations of the network is unknown. The value of nnpfc_num_kmac_operations_idc shall be in the range of 0 to $2^{32}$-2, inclusive.

The nnpfc_total_kilobyte_size greater than 0 indicates a total size in kilobytes required to store the uncompressed parameters for the neural network. The total size in bits is a number equal to or greater than the sum of bits used to store each parameter. nnpfc_total_kilobyte_size is the total size in bits divided by 8 000, rounded up. nnpfc_total_kilobyte_size equal to 0 indicates that the total size required to store the parameters for the neural network is unknown. The value of nnpfc_total_kilobyte_size shall be in the range of 0 to $2^{32}$-2, inclusive.

The nnpfc_metadata_extension_num_bits equal to 0 specifies that nnpfc_reserved_metadata_extension is not present. nnpfc_metadata_extension_num_bits greater than 0 specifies the length, in bits, of nnpfc_reserved_metadata_extension. nnpfc_metadata_extension_num_bits shall be equal to 0 in this edition of this document. Values in the range of 1 to 2 048, inclusive, for nnpfc_metadata_extension_num_bits are reserved for future use by ITU-T|ISO/IEC and shall not be present in bitstreams conforming to this edition of this document. Decoders conforming to this edition of this document shall allow any value of nnpfc_metadata_extension_num_bits in the range of 0 to 2 048, inclusive. Values of nnpfc_metadata_extension_num_bits greater than 2 048 shall not be present in bitstreams conforming to this edition of this document and are not reserved for future use.

The nnpfc_reserved_metadata_extension shall not be present in bitstreams conforming to this edition of this document. However, decoders conforming to this edition of this document shall ignore the presence and value of nnpfc_reserved_metadata_extension. When present, the length, in bits, of nnpfc_reserved_metadata_extension is equal to nnpfc_metadata_extension_num_bits.

The nnpfc_reserved_zero_bit_b shall be equal to 0 in bitstreams conforming to this edition of this document. Decoders shall ignore NNPFC SEI messages in which nnpfc_reserved_zero_bit_b is not equal to 0.

The nnpfc_payload_byte[i] contains the i-th byte of a bitstream conforming to ISO/IEC 15938-17. The byte sequence nnpfc_payload_byte[i] for all present values of i shall be a complete bitstream that conforms to ISO/IEC 15938-17.

Neural-Network Post-Filter Activation SEI Message (NNFPA)

The syntax structure for NNFPA is shown in Table 20.

TABLE 20

| | Descriptor |
|---|---|
| nn_post_filter_activation( payloadSize ) { | |
| nnpfa_target_id | ue(v) |

TABLE 20-continued

| | Descriptor |
|---|---|
| nnpfa_cancel_flag | u(1) |
| if( !nnpfa_cancel_flag ) { | |
| nnpfa_target_base_flag | u(1) |
| nnpfa_persistence_flag | u(1) |
| nnpfa_num_output_entries | ue(v) |
| for( i = 0; i < nnpfa_num_output_entries; i++ ) | |
| nnpfa_output_flag[ i ] | u(1) |
| } | |
| } | |

The NNPFA syntax structure of Table 20 can be signaled in the form of an SEI message. An SEI message signaling the NNPFA syntax structure of Table 19 can be referred to as an NNPFA SEI message.

The neural-network post-filter activation (NNPFA) SEI message activates or de-activates the possible use of the target neural-network post-processing filter (NNPF), identified by nnpfa_target_id and nnpfa_target_base_flag, for post-processing filtering of a set of pictures. For a particular picture for which the NNPF is activated, the target NNPF is derived as follows:

If nnpfa_target_base_flag is equal to 1, the target NNPF is the base NNPF with nnpfc_id equal to nnpfa_target_id.

Otherwise (nnpfa_target_base_flag is equal to 0), the target NNPF is the NNPF specified by the last NNPFC SEI message with nnpfc_id equal to nnpfa_target_id that precedes the first VCL NAL unit of the current picture in decoding order and is not a repetition of the NNPFC SEI message that contains the base NNPF.

There can be several NNPFA SEI messages present for the same picture, for example, when the NNPFs are meant for different purposes or for filtering of different colour components.

The nnpfa_target_id indicates the target NNPF, which is specified by one or more NNPFC SEI messages that pertain to the current picture and have nnpfc_id equal to nnpfa_target_id.

The value of nnpfa_target_id shall be in the range of 0 to $2^{32}$-2, inclusive. nnpfa_target_id values in the range 256 to 511 and in the range $2^{31}$ to $2^{32}$-2 may be reserved for future use. Decoders must ignore NNPFA SEI messages with nnpfa_target_id in the range 256 to 511 or $2^{31}$ to $2^{32}$-2.

An NNPFA SEI message with a particular value of nnpfa_target_id shall not be present in a current PU unless one or both of the following conditions are true:

Within the current CLVS there is an NNPFC SEI message with nnpfc_id equal to the particular value of nnpfa_target_id present in a PU preceding the current PU in decoding order.

There is an NNPFC SEI message with nnpfc_id equal to the particular value of nnpfa_target_id in the current PU.

When a PU contains both an NNPFC SEI message with a particular value of nnpfc_id and an NNPFA SEI message with nnpfa_target_id equal to the particular value of nnpfc_id, the NNPFC SEI message shall precede the NNPFA SEI message in decoding order.

The nnpfa_cancel_flag equal to 1 indicates that the persistence of the target NNPF established by any previous NNPFA SEI message with the same nnpfa_target_id as the current SEI message is cancelled, i.e., the target NNPF is no longer used unless it is activated by another NNPFA SEI message with the same nnpfa_target_id as the current SEI message and nnpfa_cancel_flag equal to 0. nnpfa_cancel_flag equal to 0 indicates that the nnpfa_target_base_flag, nnpfa_persistence_flag, and nnpfa_num_output_entries follow.

The nnpfa_target_base_flag equal to 1 specifies that the target NNPF is the base NNPF with nnpfc_id equal to nnpfa_target_id. nnpfa_target_base_flag equal to 0 specifies that the target NNPF is the NNPF specified by the last NNPFC SEI message with nnpfc_id equal to nnpfa_target_id that precedes the first VCL NAL unit of the current picture in decoding order and is not a repetition of the NNPFC SEI message that contains the base NNPF.

nnpfa_persistence_flag specifies the persistence of the target NNPF for the current layer. nnpfa_persistence_flag equal to 0 specifies that the target NNPF may be used for post-processing filtering for the current picture only. nnpfa_persistence_flag equal to 1 specifies that the target NNPF may be used for post-processing filtering for the current picture and all subsequent pictures of the current layer in output order until one or more of the following conditions are true:

A new CLVS of the current layer begins.

The bitstream ends.

A picture in the current layer associated with a NNPFA SEI message with the same nnpfa_target_id as the current SEI message and nnpfa_cancel_flag equal to 1 is output that follows the current picture in output order.

The target NNPF is not applied for this subsequent picture in the current layer associated with a NNPFA SEI message with the same nnpfa_target_id as the current SEI message and nnpfa_cancel_flag equal to 1.

Let the nnpfcTargetPictures be the set of pictures to which the last NNPFC SEI message with nnpfc_id equal to nnpfa_target_id that precedes the current NNPFA SEI message in decoding order pertains. Let nnpfaTargetPictures be the set of pictures for which the target NNPF is activated by the current NNPFA SEI message. It is a requirement of bitstream conformance that any picture included in nnpfaTargetPictures shall also be included in nnpfcTargetPictures.

The nnpfa_num_output_entries specifies the number of nnpfa_output_flag[i] syntax elements present in the NNPFA SEI message. The value of nnpfa_num_output_entries shall be in the range of 0 to NumInpPicsInOutputTensor, inclusive.

The nnpfa_output_flag[i] equal to 1 specifies that the NNPF-generated picture that corresponds to the input picture having index InpIdx[i] is output by the NNPF process activated by this NNPFA SEI message, where the NNPF process is specified in the semantics of the NNPFC SEI message. nnpfa_output_flag[i] equal to 0 specifies that the NNPF-generated picture that corresponds to the input picture having index InpIdx[i] is not output by the NNPF process activated by this NNPFA SEI message. When nnpfa_num_output_entries is less than NumInpPicsInOutputTensor, nnpfa_output_flag[i] is inferred to be equal to 1 for each value of i in the range of nnpfa_num_output_entries to NumInpPicsInOutputTensor-1, inclusive.

Post-Filter Hint

The syntax structure for post-filter hints is shown in Table 21.

TABLE 21

| | Descriptor |
|---|---|
| post_filter_hint( payloadSize ) { | |
| filter_hint_cancel_flag | u(1) |
| if( !filter_hint_cancel_flag ) { | |

TABLE 21-continued

```
                                                          Descriptor
    filter_hint_persistence_flag                          u(1)
    filter_hint_size_y                                    ue(v)
    filter_hint_size_x                                    ue(v)
    filter_hint_type                                      u(2)
    filter_hint_chroma_coeff_present_flag                 u(1)
    for( cIdx = 0; cIdx < (
    filter_hint_chroma_coeff_present_flag ?
    3 : 1 ); cIdx++ )
      for( cy = 0; cy < filter_hint_size_y; cy++ )
        for( cx = 0; cx < filter_hint_size_x; cx++ )
          filter_hint_value[ cIdx ][ cy ][ cx ]           se(v)
  }
}
```

The post-filter hint syntax structure of Table 21 can be signaled in the form of an SEI message. An SEI message signaling the post-filter hint syntax structure of Table 21 may be referred to as a post-filter hint SEI message.

This SEI message provides the coefficients of a post-filter or correlation information for the design of a post-filter for potential use in post-processing of a set of pictures after they are decoded and output to obtain improved displayed quality.

The filter_hint_cancel_flag equal to 1 indicates that the SEI message cancels the persistence of any previous post-filter hint SEI message in output order that applies to the current layer. filter_hint_cancel_flag equal to 0 indicates that post-filter hint information follows.

The filter_hint_persistence_flag specifies the persistence of the post-filter hint SEI message for the current layer. filter_hint_persistence_flag equal to 0 specifies that the post-filter hint applies to the current decoded picture only. filter_hint_persistence_flag equal to 1 specifies that the post-filter hint SEI message applies to the current decoded picture and persists for all subsequent pictures of the current layer in output order until one or more of the following conditions are true:

A new CLVS of the current layer begins.

The bitstream ends.

A picture in the current layer in an AU associated with a post-filter hint SEI message is output that follows the current picture in output order.

The filter_hint_size_y specifies the vertical size of the filter coefficient or correlation array. The value of filter_hint_size_y shall be in the range of 1 to 15, inclusive.

The filter_hint_size_x specifies the horizontal size of the filter coefficient or correlation array. The value of filter_hint_size_x shall be in the range of 1 to 15, inclusive.

The filter_hint_type identifies the type of the transmitted filter hints as specified in Table 19. The value of filter_hint_type shall be in the range of 0 to 2, inclusive. The value of filter_hint_type equal to 3 is reserved for future use and shall not be present in bitstreams conforming to this edition of this document. Decoders conforming to this edition of this document shall ignore post-filter hint SEI messages having filter_hint_type equal to 3.

TABLE 22

| Value | Description |
|---|---|
| 0 | Coefficients of a 2D-FIR filter |
| 1 | Coefficients of two 1D-FIR filters |
| 2 | Cross-correlation matrix |

The filter_hint_chroma_coeff_present_flag equal 1 specifies that filter coefficients for chroma are present. filter_hint_chroma_coeff_present_flag equal 0 specifies that filter coefficients for chroma are not present.

The filter_hint_value[cIdx][cy][cx] specifies a filter coefficient or an element of a cross-correlation matrix between the original and the decoded signal with 16-bit precision. The value of filter_hint_value[cIdx][cy][cx] shall be in the range of $-2^{31}+1$ to $2^{31}-1$, inclusive. cIdx specifies the related colour component, cy represents a counter in vertical direction and cx represents a counter in horizontal direction. Depending on the value of filter_hint_type, the following applies:

If filter_hint_type is equal to 0, the coefficients of a 2-dimensional finite impulse response (FIR) filter with the size of filter_hint_size_y*filter_hint_size_x are transmitted.

Otherwise, if filter_hint_type is equal to 1, the filter coefficients of two 1-dimensional FIR filters are transmitted. In this case, filter_hint_size_y shall be equal to 2. The index cy equal to 0 specifies the filter coefficients of the horizontal filter and cy equal to 1 specifies the filter coefficients of the vertical filter. In the filtering process, the horizontal filter is applied first and the result is filtered by the vertical filter.

Otherwise (filter_hint_type is equal to 2), the transmitted hints specify a cross-correlation matrix between the original signal s and the decoded signal s'.

The normalized cross-correlation matrix for a related colour component identified by cIdx with the size of filter_hint_size_y*filter_hint_size_x is defined as follows:

$$\text{filter\_hint\_value}(cIdx, cy, cx) = \frac{1}{(2^{8+bitDepth}-1)^2 * h * w} \sum_{m=0}^{h-1}\sum_{n=0}^{w-1} s(m, n) * s'(m + cy - OffsetY, n + cx - OffsetX) \quad \text{[Equation 10]}$$

where s denotes array of samples of the colour component cIdx of the original picture, s' denotes corresponding array of the decoded picture, h denotes the vertical height of the related colour component, w denotes the horizontal width of the related colour component, bitDepth denotes the bit depth of the colour component, OffsetY is equal to (filter_hint_size_y>>1), OffsetX is equal to (filter_hint_size_x>>1), 0<=cy<filter_hint_size_y and 0<=cx<filter_hint_size_x.

A decoder can derive a Wiener post-filter from the cross-correlation matrix of original and decoded signal and the auto-correlation matrix of the decoded signal.

Problem(s) Description

In the current design of neural-network post-filter characteristic (NNPFC) and neural-network post-filter activation SEI messages, an NNPFA SEI message can activate a base filter (i.e., NNPFC SEI message with nnpfc_base_flag equal to 1) or an update filter (i.e., NNPFC SEI message with nnpfc_base_flag equal to 0) based on the value of nnpfa_target_base_flag.

The nnpfa_target_base_flag is signalled only when the value of nnpfa_cancel_flag is equal to 0. It is asserted that this causes problem in identifying which NNPFA activation needs to be cancelled when there are two activation of NNPF of the same nnpfa_target_id but with different value of nnpfa_target_base_flag.

In other words, when both base and update NNPF with the same nnpfc_id are activated for the same picture, it is unclear how to distinguish which persistence of these two will be cancel when later a new NNPFA SEI message with the same nnpfa_target_id with nnpfa_cancel_flag equal to 1 is present, unless such case is not allowed.

EMBODIMENTS

The following inventions provide solutions to the problem; described above. Each invention item may be applicable individually or in combinations.

The embodiments proposed by the present invention are summarized as follows.

Signal nnpfa_target_base_flag without being conditioned of the value of nnpfa_cancel_flag.

When the value of nnpfa_cancel_flag is equal to 1, it cancels the persistence of the target NNPF with that was previously activated with the same value of nnpfa_target_id and nnpfa_target_base_flag.

Alternatively, when an NNPFA with a particular nnpfa_target_id and nnpfa_target_base_flag is present, it cancels the persistence of the previously NNPFA SEI message, in output order, with the same values of nnpfa_target_id and nnpfa_target_base_flag.

In another alternative, it is constraint that there shall be no two (or more) NNPFA SEI message active (i.e, with nnpfa_cancel_flag equal to 0) for the same picture regardless their value of nnpfa_target_base_flag.

In other words, there shall be no two NNPFA SEI message with the same value of nnpfa_target_id, nnpfa_cancel_flag equal to 0, regardless the value of nnpfa_target_base_flag, active for the same picture.

Embodiment 1

Example 1 provides a description of Summary 1 and Summary 2 described above. The table can be updated as follows:

TABLE 23

| | Descriptor |
|---|---|
| nn_post_filter_activation( payloadSize ) { | |
| nnpfa_target_id | ue(v) |
| nnpfa_target_base_flag | u(1) |
| nnpfa_cancel_flag | u(1) |
| if( !nnpfa_cancel_flag ) { | |
| nnpfa_persistence_flag | u(1) |
| nnpfa_num_output_entries | ue(v) |
| for( i = 0; i < nnpfa_num_output_entries; i++ ) | |
| nnpfa_output_flag[ i ] | u(1) |
| } | |
| } | |

The neural-network post-filter activation (NNPFA) SEI message activates or de-activates the possible use of the target neural-network post-processing filter (NNPF), identified by nnpfa_target_id and nnpfa_target_base_flag, for post-processing filtering of a set of pictures. For a particular picture for which the NNPF is activated, the target NNPF is derived as follows:

If nnpfa_target_base_flag is equal to 1, the target NNPF is the base NNPF with nnpfc_id equal to nnpfa_target_id.

Otherwise (nnpfa_target_base_flag is equal to 0), the target NNPF is the NNPF specified by the last NNPFC SEI message with nnpfc_id equal to nnpfa_target_id that precedes the first VCL NAL unit of the current picture in decoding order and is not a repetition of the NNPFC SEI message that contains the base NNPF.

There can be several NNPFA SEI messages present for the same picture, for example, when the NNPFs are meant for different purposes or for filtering of different colour components.

The nnpfa_target_id indicates the target NNPF, which is specified by one or more NNPFC SEI messages that pertain to the current picture and have nnpfc_id equal to nnpfa_target_id. The value of nnpfa_target_id shall be in the range of 0 to $2^{32}$-2, inclusive.

An NNPFA SEI message with a particular value of nnpfa_target_id shall not be present in a current PU unless one or both of the following conditions are true:

Within the current CLVS there is an NNPFC SEI message with nnpfc_id equal to the particular value of nnpfa_target_id present in a PU preceding the current PU in decoding order.

There is an NNPFC SEI message with nnpfc_id equal to the particular value of nnpfa_target_id in the current PU.

When a PU contains both an NNPFC SEI message with a particular value of nnpfc_id and an NNPFA SEI message with nnpfa_target_id equal to the particular value of nnpfc_id, the NNPFC SEI message shall precede the NNPFA SEI message in decoding order.

The nnpfa_target_base_flag equal to 1 specifies that the target NNPF is the base NNPF with nnpfc_id equal to nnpfa_target_id. nnpfa_target_base_flag equal to 0 specifies that the target NNPF is the NNPF specified by the last NNPFC SEI message with nnpfc_id equal to nnpfa_target_id that precedes the first VCL NAL unit of the current picture in decoding order and is not a repetition of the NNPFC SEI message that contains the base NNPF.

The nnpfa_cancel_flag equal to 1 indicates that the persistence of the target NNPF established by any previous NNPFA SEI message with the same nnpfa_target_id and nnpfa_target_base_flag as the current SEI message is cancelled, i.e., the target NNPF is no longer used unless it is activated by another NNPFA SEI message with the same nnpfa_target_id and nnpfa_target_base_flag as the current SEI message and nnpfa_cancel_flag equal to 0. nnpfa_cancel_flag equal to 0 indicates that the nnpfa_persistence_flag, and nnpfa_num_output_entries follow.

The nnpfa_persistence_flag specifies the persistence of the target NNPF for the current layer.

The nnpfa_persistence_flag equal to 0 specifies that the target NNPF may be used for post-processing filtering for the current picture only.

The nnpfa_persistence_flag equal to 1 specifies that the target NNPF may be used for post-processing filtering for the current picture and all subsequent pictures of the current layer in output order until one or more of the following conditions are true:

A new CLVS of the current layer begins.

The bitstream ends.

A picture in the current layer associated with a NNPFA SEI message with the same nnpfa_target_id and nnpfa_target_base_flag as the current SEI message and nnpfa_cancel_flag equal to 1 is output that follows the current picture in output order.

The target NNPF is not applied for this subsequent picture in the current layer associated with a NNPFA SEI message with the same nnpfa_target_id and nnpfa_target_base_flag as the current SEI message and nnpfa_cancel_flag equal to 1. In other words, if the nnpfa_persistence_flag value is 1, the target NNPF can be used until the picture of the current layer is output next to the current picture in the output order based on the nnpfa_cancel_flag value being 1 included in the NNPFA SEI message that has the same nnpfa_target_id and nnpfa_target_base_flag as the current SEI message.

Let the nnpfcTargetPictures be the set of pictures to which the last NNPFC SEI message with nnpfc_id equal to nnpfa_target_id that precedes the current NNPFA SEI message in decoding order pertains. Let nnpfaTargetPictures be the set of pictures for which the target NNPF is activated by the current NNPFA SEI message. It is a requirement of bitstream conformance that any picture included in nnpfaTargetPictures shall also be included in nnpfcTargetPictures.

Embodiment 2

Example 2 provides an explanation of Summaries 1 and 3 described above. The table can be updated as follows:

TABLE 24

| | Descriptor |
|---|---|
| nn_post_filter_activation( payloadSize ) { | |
| nnpfa_target_id | ue(v) |
| nnpfa_target_base_flag | u(1) |
| nnpfa_cancel_flag | u(1) |
| if( !nnpfa_cancel_flag ) { | |
| nnpfa_persistence_flag | u(1) |
| nnpfa_num_output_entries | ue(v) |
| for( i = 0; i < nnpfa_num_output_entries; i++ ) | |
| nnpfa_output_flag[ i ] | u(1) |
| } | |
| } | |

The neural-network post-filter activation (NNPFA) SEI message activates or de-activates the possible use of the target neural-network post-processing filter (NNPF), identified by nnpfa_target_id and nnpfa_target_base_flag, for post-processing filtering of a set of pictures. For a particular picture for which the NNPF is activated, the target NNPF is derived as follows:

If nnpfa_target_base_flag is equal to 1, the target NNPF is the base NNPF with nnpfc_id equal to nnpfa_target_id.

Otherwise (nnpfa_target_base_flag is equal to 0), the target NNPF is the NNPF specified by the last NNPFC SEI message with nnpfc_id equal to nnpfa_target_id that precedes the first VCL NAL unit of the current picture in decoding order and is not a repetition of the NNPFC SEI message that contains the base NNPF.

There can be several NNPFA SEI messages present for the same picture, for example, when the NNPFs are meant for different purposes or for filtering of different colour components.

The nnpfa_target_id indicates the target NNPF, which is specified by one or more NNPFC SEI messages that pertain to the current picture and have nnpfc_id equal to nnpfa_target_id. The value of nnpfa_target_id shall be in the range of 0 to $2^{32}$-2, inclusive.

An NNPFA SEI message with a particular value of nnpfa_target_id shall not be present in a current PU unless one or both of the following conditions are true:

Within the current CLVS there is an NNPFC SEI message with nnpfc_id equal to the particular value of nnpfa_target_id present in a PU preceding the current PU in decoding order.

There is an NNPFC SEI message with nnpfc_id equal to the particular value of nnpfa_target_id in the current PU.

When a PU contains both an NNPFC SEI message with a particular value of nnpfc_id and an NNPFA SEI message with nnpfa_target_id equal to the particular value of nnpfc_id, the NNPFC SEI message shall precede the NNPFA SEI message in decoding order.

The nnpfa_target_base_flag equal to 1 specifies that the target NNPF is the base NNPF with nnpfc_id equal to nnpfa_target_id. nnpfa_target_base_flag equal to 0 specifies that the target NNPF is the NNPF specified by the last NNPFC SEI message with nnpfc_id equal to nnpfa_target_id that precedes the first VCL NAL unit of the current picture in decoding order and is not a repetition of the NNPFC SEI message that contains the base NNPF.

The nnpfa_cancel_flag equal to 1 indicates that the persistence of the target NNPF established by any previous NNPFA SEI message with the same nnpfa_target_id and nnpfa_target_base_flag as the current SEI message is cancelled, i.e., the target NNPF is no longer used unless it is activated by another NNPFA SEI message with the same nnpfa_target_id and nnpfa_target_base_flag as the current SEI message and nnpfa_cancel_flag equal to 0. nnpfa_cancel_flag equal to 0 indicates that the nnpfa_persistence_flag, and nnpfa_num_output_entries follow.

The nnpfa_persistence_flag specifies the persistence of the target NNPF for the current layer.

The nnpfa_persistence_flag equal to 0 specifies that the target NNPF may be used for post-processing filtering for the current picture only.

The nnpfa_persistence_flag equal to 1 specifies that the target NNPF may be used for post-processing filtering for the current picture and all subsequent pictures of the current layer in output order until one or more of the following conditions are true:

A new CLVS of the current layer begins.

The bitstream ends.

A picture in the current layer associated with a NNPFA SEI message with the same nnpfa_target_id and nnpfa_target_base_flag as the current SEI message is output that follows the current picture in output order.

The target NNPF is not applied for this subsequent picture in the current layer associated with a NNPFA SEI message with the same nnpfa_target_id and nnpfa_target_base_flag as the current SEI message and nnpfa_cancel_flag equal to 1. In other words, if the nnpfa_persistence_flag value is 1, the target NNPF can be used until the picture of the current layer is output next to the current picture in the output order, regardless of the value of nnpfa_cancel_flag included in the NNPFA SEI message that has the same nnpfa_target_id and nnpfa_target_base_flag as the current SEI message.

Let the nnpfcTargetPictures be the set of pictures to which the last NNPFC SEI message with nnpfc_id equal to nnpfa_target_id that precedes the current NNPFA SEI message in decoding order pertains. Let nnpfaTargetPictures be the set of pictures for which the target NNPF is activated by the current NNPFA SEI message. It is a requirement of bitstream conformance that any picture included in nnpfaTargetPictures shall also be included in nnpfcTargetPictures.

Embodiment 3

Example 3 provides an explanation of Summary 4 described above. The table can be updated as follows:

TABLE 25

| | Descriptor |
|---|---|
| nn_post_filter_activation( payloadSize ) { | |
| nnpfa_target_id | ue(v) |
| nnpfa_cancel_flag | u(1) |
| if( !nnpfa_cancel_flag ) { | u(1) |
| nnpfa_target_base_flag | |

TABLE 25-continued

| | Descriptor |
|---|---|
| nnpfa_persistence_flag | u(1) |
| nnpfa_num_output_entries | u(1) |
| for( i = 0; i < nnpfa_num_output_entries; i++ ) | ue(v) |
| nnpfa_output_flag[ i ] | |
| } | u(1) |
| } | |

The neural-network post-processing filter (NNPF), identified by nnpfa_target_id and nnpfa_target_base_flag, for post-processing filtering of a set of pictures. For a particular picture for which the NNPF is activated, the target NNPF is derived as follows:

If nnpfa_target_base_flag is equal to 1, the target NNPF is the base NNPF with nnpfc_id equal to nnpfa_target_id.

Otherwise (nnpfa_target_base_flag is equal to 0), the target NNPF is the NNPF specified by the last NNPFC SEI message with nnpfc_id equal to nnpfa_target_id that precedes the first VCL NAL unit of the current picture in decoding order and is not a repetition of the NNPFC SEI message that contains the base NNPF.

There can be several NNPFA SEI messages present for the same picture, for example, when the NNPFs are meant for different purposes or for filtering of different colour components.

The nnpfa_target_id indicates the target NNPF, which is specified by one or more NNPFC SEI messages that pertain to the current picture and have nnpfc_id equal to nnpfa_target_id. The value of nnpfa_target_id shall be in the range of 0 to $2^{32}$-2, inclusive.

An NNPFA SEI message with a particular value of nnpfa_target_id shall not be present in a current PU unless one or both of the following conditions are true:

Within the current CLVS there is an NNPFC SEI message with nnpfc_id equal to the particular value of nnpfa_target_id present in a PU preceding the current PU in decoding order.

There is an NNPFC SEI message with nnpfc_id equal to the particular value of nnpfa_target_id in the current PU.

When a PU contains both an NNPFC SEI message with a particular value of nnpfc_id and an NNPFA SEI message with nnpfa_target_id equal to the particular value of nnpfc_id, the NNPFC SEI message shall precede the NNPFA SEI message in decoding order.

The nnpfa_cancel_flag equal to 1 indicates that the persistence of the target NNPF established by any previous NNPFA SEI message with the same nnpfa_target_id as the current SEI message is cancelled, i.e., the target NNPF is no longer used unless it is activated by another NNPFA SEI message with the same nnpfa_target_id as the current SEI message and nnpfa_cancel_flag equal to 0. nnpfa_cancel_flag equal to 0 indicates that the nnpfa_target_base_flag, nnpfa_persistence_flag, and nnpfa_num_output_entries follow.

The nnpfa_target_base_flag equal to 1 specifies that the target NNPF is the base NNPF with nnpfc_id equal to nnpfa_target_id. nnpfa_target_base_flag equal to 0 specifies that the target NNPF is the NNPF specified by the last NNPFC SEI message with nnpfc_id equal to nnpfa_target_id that precedes the first VCL NAL unit of the current picture in decoding order and is not a repetition of the NNPFC SEI message that contains the base NNPF.

It is constrained that there shall be no two NNPFA SEI messages active (i.e, with nnpfa_cancel_flag equal to 0) for the same picture regardless their value of nnpfa_target_base_flag.

The nnpfa_persistence_flag specifies the persistence of the target NNPF for the current layer.

The nnpfa_persistence_flag equal to 0 specifies that the target NNPF may be used for post-processing filtering for the current picture only.

The nnpfa_persistence_flag equal to 1 specifies that the target NNPF may be used for post-processing filtering for the current picture and all subsequent pictures of the current layer in output order until one or more of the following conditions are true:

A new CLVS of the current layer begins.

The bitstream ends.

A picture in the current layer associated with a NNPFA SEI message with the same nnpfa_target_id as the current SEI message and nnpfa_cancel_flag equal to 1 is output that follows the current picture in output order.

The target NNPF is not applied for this subsequent picture in the current layer associated with a NNPFA SEI message with the same nnpfa_target_id as the current SEI message and nnpfa_cancel_flag equal to 1.

Let the nnpfcTargetPictures be the set of pictures to which the last NNPFC SEI message with nnpfc_id equal to nnpfa_target_id that precedes the current NNPFA SEI message in decoding order pertains. Let nnpfaTargetPictures be the set of pictures for which the target NNPF is activated by the current NNPFA SEI message. It is a requirement of bitstream conformance that any picture included in nnpfaTargetPictures shall also be included in nnpfcTargetPictures.

Image Encoding Method and Image Decoding Method

Hereinafter, an image encoding method and an image decoding method according to various embodiments of the present application will be described.

Figure 6:
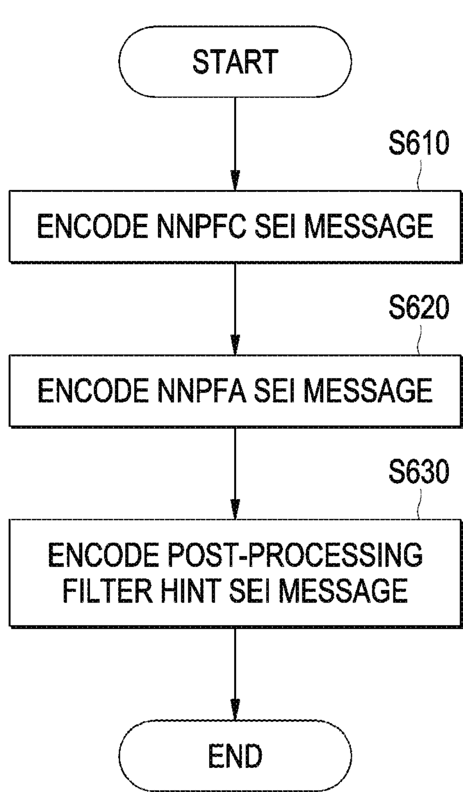
FIG. 6 is a diagram illustrating an image encoding method of an image encoding apparatus.
Figure 7:
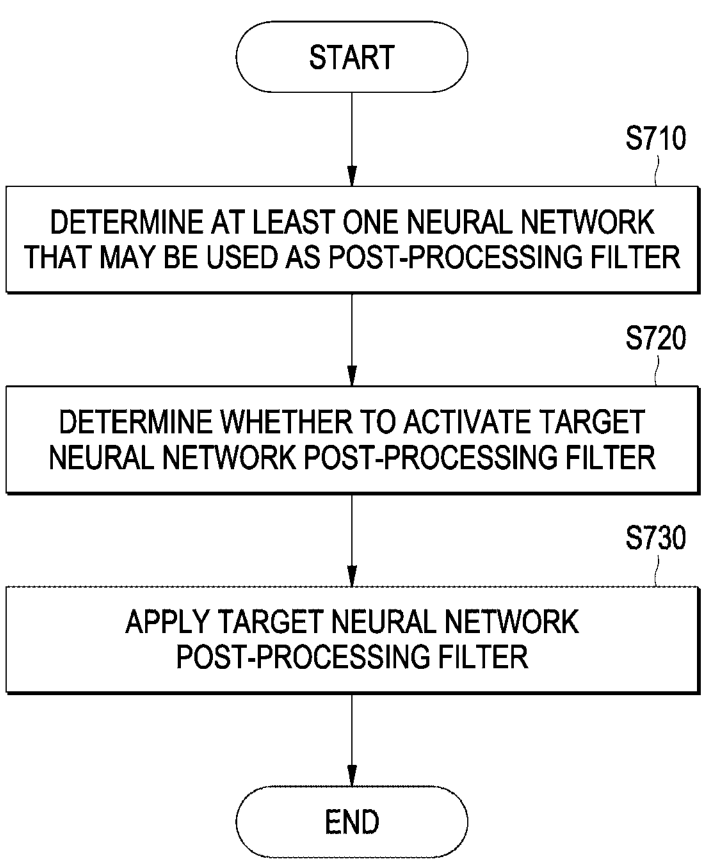
FIG. 7 is a diagram illustrating an image decoding method of an image decoding apparatus.

FIG. 6 is a diagram illustrating an image encoding method of an image encoding apparatus, and FIG. 7 is a diagram illustrating an image decoding method of an image decoding apparatus.

Referring to FIG. 6, the image encoding apparatus 200 may encode information on at least one neural network that may be used as a post-processing filter into at least one NNPFC SEI message (S610). In other words, the image encoding apparatus 200 may determine the at least one neural network that may be used as a post-processing filter, and encode the information on the determined at least one neural network into the at least one NNPFC SEI message.

The image encoding apparatus 200 may encode information on a target NNPF applicable to the current picture, activation or non-activation of which has been determined, into an NNPFA SEI message (S620). In other words, the image encoding apparatus 200 may determine whether to activate the target NNPF applicable to the current picture, and encode the information on the determined target NNPF into the NNPFA SEI message.

The process of determining whether to activate the target NNPF may include an operation of determining the target NNPF applicable to the current picture, an operation of determining whether to cancel the persistence of the target NNPF, an operation of determining the persistence of the target NNPF, and the like. For example, the image encoding apparatus 200 may determine the target NNPF applicable to the current picture and determine whether to cancel the persistence of the target NNPF in accordance with whether there is a previous NNPFA SEI message with the same target NNPF identification information. When there is a previous NNPFA SEI message with the same target NNPF identification information, the image encoding apparatus 200 may determine to cancel the persistence of the target NNPF designated by a corresponding NNPFA SEI message. When it is determined not to cancel the persistence of the target NNPF, the image encoding apparatus 200 may determine the persistence of the target NNPF. The information on the target NNPF which is determined in this way may be encoded into the NNPFA SEI message.

The image encoding apparatus 200 may encode post-filter coefficients, correlation information, or the like regarding a post-filter design into a post-filter hint SEI message (S630). The NNPFC SEI message, the NNPFA SEI message, and/or the post-filter hint SEI message may be included in an NNPF SEI message.

Referring to FIG. 7, the image decoding apparatus 300 may acquire SEI messages for an NNPF to be applied to the current picture from a bitstream. The SEI messages for the NNPF may include an NNPFC SEI message, an NNPFA SEI message, and/or a post-filter hint SEI message.

When the SEI messages for the NNPF are applied to the current picture, the image decoding apparatus 300 may determine at least one neural network that may be used as a post-processing filter on the basis of at least one NNPFC SEI message included in the SEI messages for the NNPF (S710).

The image decoding apparatus 300 may determine whether to activate a target NNPF applicable to the current picture on the basis of at least one NNPFA SEI message acquired from the bitstream (S720).

The process of determining whether to activate the target NNPF may include an operation of determining the target NNPF, an operation of determining whether to cancel the persistence of the target NNPF, an operation of determining the persistence of the target NNPF, and the like. For example, the process of determining whether to activate the target NNPF may include an operation of determining the target NNPF on the basis of the NNPFA SEI message, an operation of determining whether to cancel the persistence of the target NNPF, an operation of determining the persistence of the target NNPF, and the like. Here, target NNPF identification information may include nnpfa_target_id or nnpfa_target_id and nnpfa_target_base_flag.

The target NNPF may be determined on the basis of nnpfa_target_id which is an identifier indicating the target NNPF. According to various embodiments, the target NNPF may be determined on the basis of nnpfa_target_id and nnpfa_target_base_flag.

nnpfa_target_id may indicate the target NNPF specified by one or more NNPFC SEI messages which are related to the current picture and have filter identification information identical to the target NNPF identification information (i.e., nnpfc_id).

nnpfa_target_base_flag may indicate whether the target NNPF is a base NNPF with filter identification information identical to the target NNPF identification information or an NNPF designated by the last NNPF SEI message with the same identification information that precedes the first VCL NAL unit in decoding order. In other words, the target NNPF may be determined as the base NNPF with the filter identification information identical to the target NNPF identification information on the basis of a target filter flag. In addition, the target NNPF may be determined as an NNPF designated by the last NNPFC SEI message with the filter identification information identical to the target NNPF identification information that precedes the first VCL NAL unit of the current picture in decoding order, on the basis of the target filter flag. Here, the target NNPF may not be a repetition of an NNPFC SEI message containing the base NNPF.

The image decoding apparatus 300 may determine whether there is a previous NNPFA SEI message with the same target NNPF identification information as the current NNPFA SEI message, and when there is a previous NNPFA SEI message with the same target NNPF identification information as the current NNPFA SEI message, may determine whether to cancel the persistence of the target NNPF. In this case, the image decoding apparatus 300 may determine whether to cancel the persistence of the target NNPF on the basis of nnpfa_cancel_flag which is a persistence cancellation flag indicating whether to cancel the persistence of a target NNPF.

nnpfa_cancel_flag may indicate whether to cancel the persistence of a target NNPF set by a previous NNPFA SEI message with the same target NNPF identification information as the current SEI message (e.g., the current NNPFA SEI message). For example, when the value of nnpfa_cancel_flag is equal to 1, the persistence of a target NNPF set by a previous NNPFA SEI message including the same target NNPF identification information and target filter flag as the current SEI message may be cancelled. Here, the target NNPF may not be used anymore unless activated by another NNPFA SEI message with the same target NNPF identification information and target filter flag as the current SEI message and a nnpfa_cancel_flag value equal to 0. For example, when the nnpfa_cancel_flag value is equal to 0, nnpfa_persistence_flag which is a flag indicating the persistence of a target NNPF, and nnpfa_target_base_flag may be derived.

According to various embodiments, when the value of nnpfa_cancel_flag is equal to 0, nnpfa_target_base_flag, nnpfa_persistence_flag, and nnpfa_num_output_entries may be derived.

The image decoding apparatus 300 may determine the persistence of the target NNPF on the basis of the nnpfa_persistence_flag value. For example, when nnpfa_persistence_flag is equal to 0, the target NNPF may be only used for the current picture. For example, when nnpfa_persistence_flag is equal to 1, the target NNPF may be used for the current picture and all subsequent pictures of the current picture in output order. Here, the target NNPF may be used for the current picture and all subsequent pictures of the current picture in output order until one or more of the following conditions are satisfied: a new CLV of the current layer begins; the bitstream ends; and a picture of the current layer associated with an NNPFA SEI message with the same nnpfa_target_id and nnpfa_target_base_flag as the current NNPFA SEI message and nnpfa_cancel_flag equal to 1 is output after the current picture in output order. In other words, the persistence of the target NNPF may be determined on the basis of whether the picture of the current layer associated with an NNPFA SEI message with the same nnpfa_target_id and nnpfa_target_base_flag as the current NNPFA SEI message and nnpfa_cancel_flag equal to 1 is output after the current picture in output order According to various embodiments, when the value of nnpfa_persistence_flag is equal to 1, the target NNPF may be used for the current picture and all subsequent pictures of the current picture in output order until a picture of the current layer associated with an NNPFA SEI message with the same nnpfa_target_id and nnpfa_target_base_flag as the current NNPFA SEI message is output after the current picture in output order. In other words, the persistence of the target NNPF may be determined on the basis of whether the picture of the current layer associated with an NNPFA SEI message with the same nnpfa_target_id and nnpfa_target_base_flag as the current NNPFA SEI message is output after the current picture in output order irrespective of the nnpfa_cancel_flag value included in the NNPFA SEI message related to the picture of the current layer.

According to various embodiments, irrespective of the nnpfa_target_base_flag value, two or more NNPFA SEI messages for the same picture may not be activated.

According to various embodiments, the target NNPF may not be applied to a subsequent picture of the current layer associated with an NNPFA SEI message with the same nnpfa_target_id as the current SEI message and nnpfa_cancel_flag equal to 1.

Figure 8:
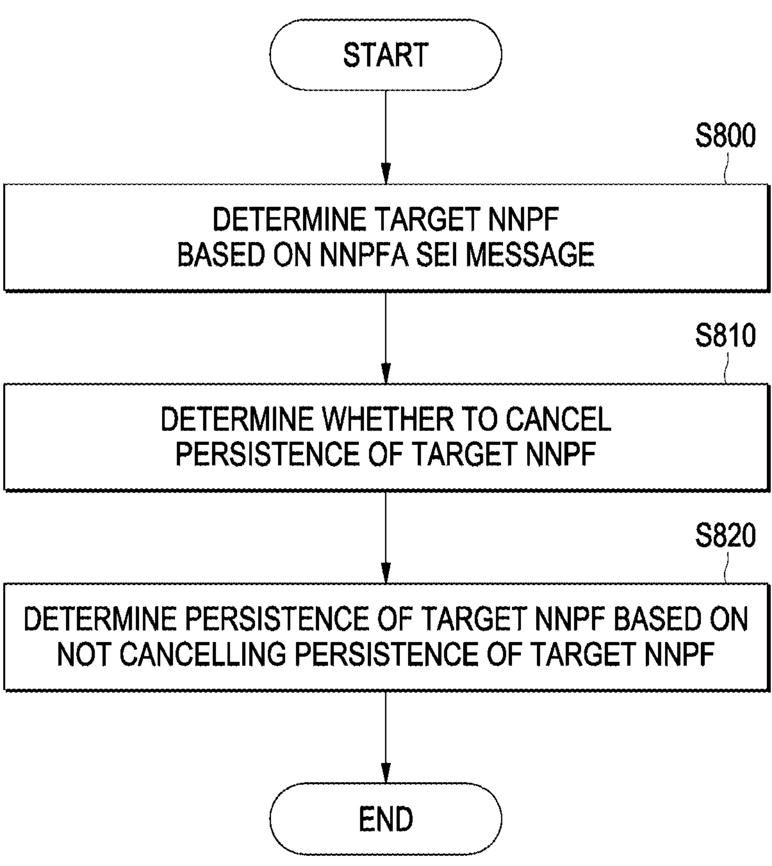
FIG. 8 is a diagram illustrating an image decoding method for an embodiment of determining whether to activate a target neural network post-filter (NNPF).

FIG. 8 is a diagram illustrating an image decoding method for an embodiment of determining whether to activate a target NNPF.

Referring to FIG. 8, the image decoding apparatus 300 may determine a target NNPF on the basis of an NNPFA SEI message (S800). For example, the image decoding apparatus 300 may determine the target NNPF on the basis of target NNPF identification information (i.e., nnpfa_target_id) of the NNPFA SEI message. For example, the image decoding apparatus 300 may determine the target NNPF designated by one or more NNPFC SEI messages with the nnpfc_id value identical to the nnpfa_target_id value that are associated with the current picture.

The image decoding apparatus 300 may determine whether to cancel the persistence of the target NNPF (S810). For example, the image decoding apparatus 300 may determine whether to cancel the persistence of the target NNPF on the basis of a persistence cancellation flag indicating whether to cancel the persistence of a target NNPF (i.e., nnpfa_cancel_flag).

For example, when the persistence cancellation flag value is equal to 1, the image decoding apparatus 300 may determine to cancel the persistence of a target NNPF set by any previous NNPFA SEI message with the same NNPF identification information as the current SEI message. In other words, the target NNPF may not be used anymore unless activated by another NNPFA SEI message with the same target NNPF identification information as the current SEI message and a persistence cancellation flag value equal to 0. For example, when the persistence cancellation flag value is equal to 0, the image decoding apparatus 300 may determine not to cancel the persistence of the target NNPF.

The image decoding apparatus 300 may determine the persistence of the target NNPF on the basis of not cancelling the persistence of the target NNPF (S830). For example, when the persistence of the target NNPF is not cancelled, the image decoding apparatus 300 may determine to only use the target NNPF for postprocessing filtering of the current picture or to use the target NNPF for postprocessing filtering of the current picture and all subsequent pictures in the current layer in output order until the above-described condition is satisfied.

In this way, when the persistence of the target NNPF is determined, the image decoding apparatus 300 may determine or continue activation of the target NNPF.

Figure 9:
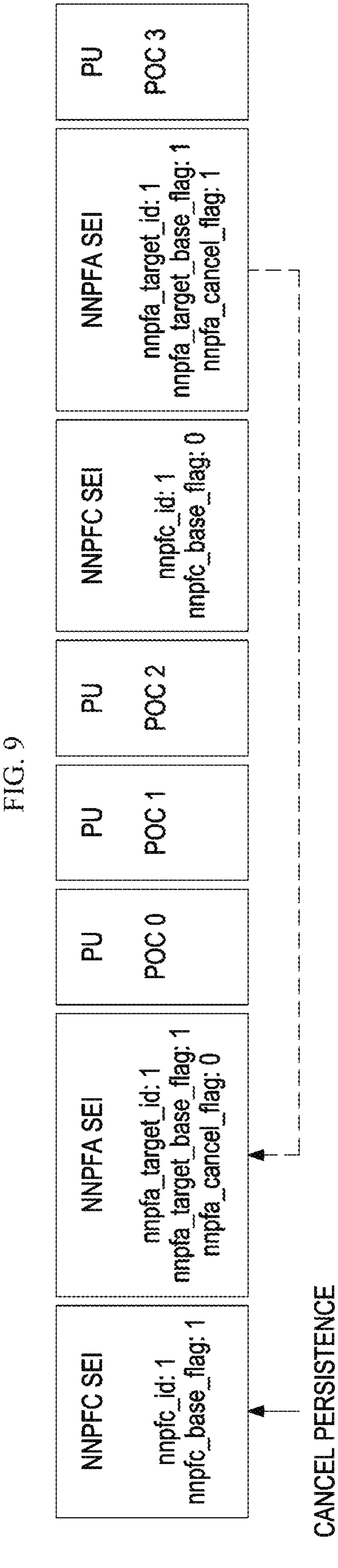
FIGS. 9 to 11 are diagrams illustrating various embodiments regarding whether to cancel the persistence of a target NNPF.
Figure 10:
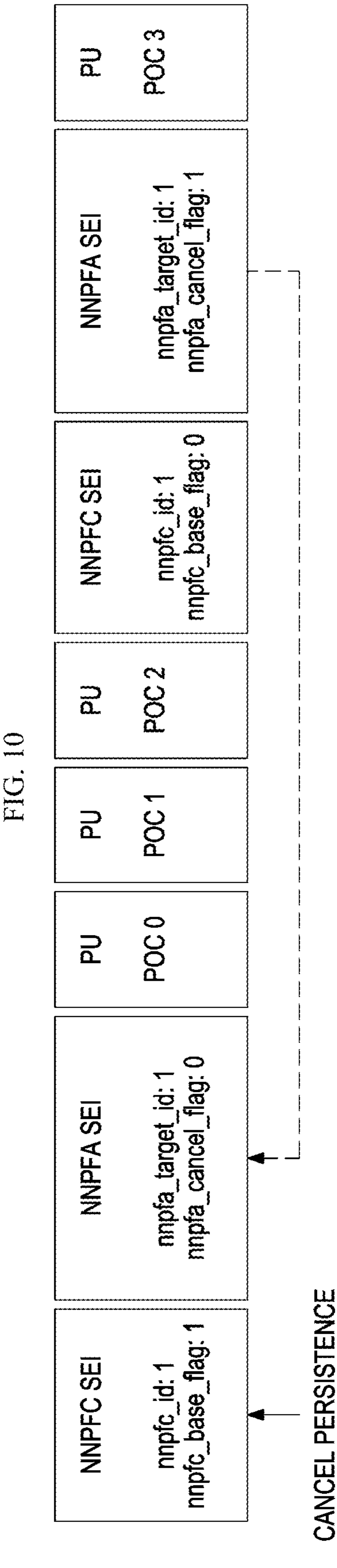
Figure 11:
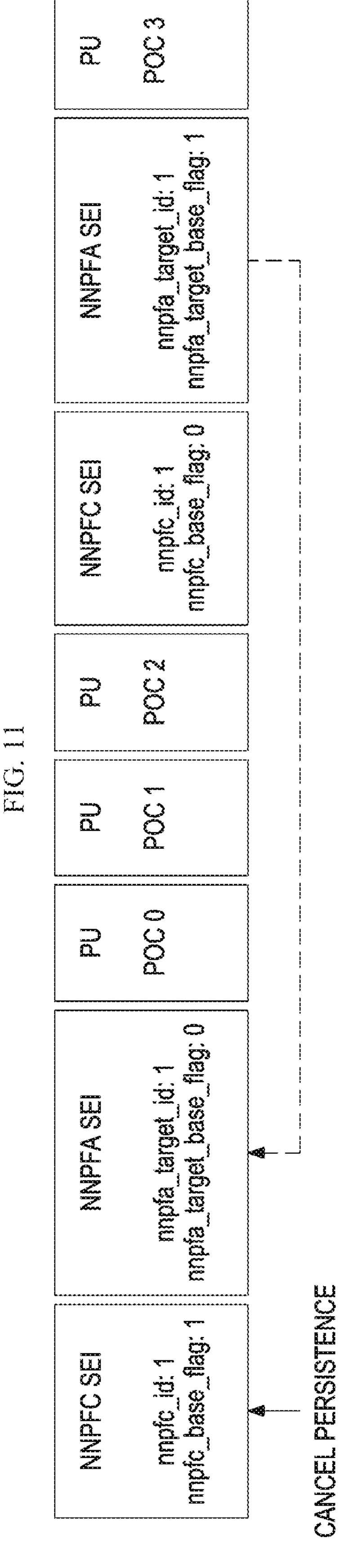

FIGS. 9 to 11 are diagrams illustrating various embodiments regarding whether to cancel the persistence of a target NNPF.

As shown in FIG. 9, when the nnpfa_cancel_flag value of the current NNPFA SEI message is 1 and there is a previous NNPFA SEI message with the same target NNPF identification information as the current NNPFA SEI message (i.e., the nnpfa_target_id value is equal to 1 and the nnpfa_target_base_flag value is equal to 1), the persistence of a target NNPF designated by the NNPFC SEI message with the nnpfa_id value equal to 1 and the nnpfa_base_flag value equal to 1 may be cancelled.

As shown in FIG. 10, when there is a previous NNPFA SEI message with the same target NNPF identification information as the current NNPFA SEI message (i.e., the nnpfa_target_id value is equal to 1, and the nnpfa_target_base_flag value is equal to 1), the persistence of a target NNPF may be cancelled irrespective of the nnpfa_cancel_flag value included in the current NNPFA SEI message.

As shown in FIG. 11, when there is a previous NNPFA SEI message with the same target NNPF identification information as the current NNPFA SEI message (i.e., the nnpfa_target_id value is equal to 1), the persistence of a target NNPF may be cancelled.

FIG. 12 is a diagram exemplifying a content streaming system to which an embodiment according to the present disclosure can be applied.

Referring to FIG. 9, the content streaming system to which the embodiment(s) of the present document is applied may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. smartwatches, smart glasses, head mounted displays), digital TVs, desktops computer, digital signage, and the like.

Each server in the content streaming system may be operated as a distributed server, in which case data received from each server may be distributed.

The scope of the present disclosure includes software or machine-executable instructions (e.g., an operating system, an application, firmware, a program, etc.) that cause operations according to various embodiments of the present disclosure to be executed on a device or a computer, and a non-transitory computer-readable medium having such software or instructions stored thereon and being executable on the device or the computer.

The embodiment according to the present disclosure can be used to encode/decode images.

What is claimed is:

1. An image decoding method performed by a decoding apparatus, the image decoding method comprising:

obtaining neural-network post-filter (NNPF) supplemental enhancement information (SEI) message, the NNPF SEI message including a neural-network post-filter characteristics (NNPFC) SEI message and a neural-network post-filter activation (NNPFA) SEI message;

determining a neural-network that can be used as a post-processing filer based on the NNPFC SEI message; and determining whether to activate a target NNPF that can be applied to the current picture based on the NNPFA SEI message, wherein the target NNPF is used for post-processing filtering for the current picture and subsequent pictures of a current layer in output order until a picture in a current layer associated with another NNPFA SEI message with the same target NNPF ID information as a current SEI message regardless of a value of a persistence cancellation flag included in the another NNPFA SEI message is output that follows the current picture in the output order, and wherein the target NNPF is not applied for the picture in the current layer associated with the another NNPFA SEI message with the same target NNPF ID information as the current SEI message regardless of the value of the persistence cancellation flag included in the another NNPFA SEI message.

2. The image decoding method of claim 1, wherein the determining whether to activate the target NNPF comprises:

determining the target NNPF;

determining whether to cancel a persistence of the target NNPF; and determining the persistence of the target NNPF based on not canceling the persistence of the target NNPF.

3. The image decoding method of claim 1, wherein the target NNPF is determined based on target NNPF ID information indicating the target NNPF specified by one or more NNPFC SEI messages that pertain to the current picture and have the same NNPF ID information as the NNPFA SEI message.

4. An image encoding method performed by an encoding apparatus, the image encoding method comprising:

encoding a neural-network post-filter characteristics (NNPFC) SEI message for a neural-network that can be used as a post-processing filer; and encoding a neural-network post-filter activation (NNPFA) SEI message for whether a target NNPF that can be applied to the current picture is activated, wherein the target NNPF is used for post-processing filtering for the current picture and subsequent pictures of a current layer in output order until a picture in a current layer associated with another NNPFA SEI message with the same target NNPF ID information as a current SEI message regardless of a value of a persistence cancellation flag included in the another NNPFA SEI message is output that follows the current picture in the output order, and wherein the target NNPF is not applied for the picture in the current layer associated with the another NNPFA SEI message with the same target NNPF ID information as the current SEI message regardless of the value of the persistence cancellation flag included in the another NNPFA SEI message.

5. The image encoding method of claim 4, whether to activate the target NNPF is determined based on determining the target NNPF, determining whether to cancel a persistence of the target NNPF and determining the persistence of the target NNPF based on not canceling the persistence of the target NNPF.

6. The image encoding method of claim 4, wherein the target NNPF is determined based on target NNPF ID information indicating the target NNPF specified by one or more NNPFC SEI messages that pertain to the current picture and have the same NNPF ID information as the NNPFA SEI message.

7. A method of transmitting data of an image, the method comprising:

generating a bitstream of the image, the bitstream is generated by encoding a neural-network post-filter characteristics (NNPFC) SEI message for a neural-network that can be used as a post-processing filer and encoding a neural-network post-filter activation (NNPFA) SEI message for whether a target NNPF that can be applied to the current picture is activated, and transmitting the data including the bitstream, wherein the target NNPF is used for post-processing filtering for the current picture and subsequent pictures of a current layer in output order until a picture in a current layer associated with another NNPFA SEI message with the same target NNPF ID information as a current SEI message regardless of a value of a persistence cancellation flag included in the another NNPFA SEI message is output that follows the current picture in the output order, and wherein the target NNPF is not applied for the picture in the current layer associated with the another NNPFA SEI message with the same target NNPF ID information as the current SEI message regardless of the value of the persistence cancellation flag included in the another NNPFA SEI message.

* * * * *